United States Patent
Ito et al.

(10) Patent No.: US 7,859,981 B2
(45) Date of Patent: Dec. 28, 2010

(54) WRITE-ONCE RECORDING MEDIUM, RECORDING METHOD, RECORDING APPARATUS, REPRODUCTION METHOD, AND REPRODUCTION APPARATUS

(75) Inventors: Motoshi Ito, Osaka (JP); Hiroshi Ueda, Nara (JP)

(73) Assignee: Panasonic Corporation, Osaka (JP)

( * ) Notice: Subject to any disclaimer, the term of this patent is extended or adjusted under 35 U.S.C. 154(b) by 101 days.

(21) Appl. No.: 12/408,754

(22) Filed: Mar. 23, 2009

(65) Prior Publication Data

US 2009/0190456 A1    Jul. 30, 2009

Related U.S. Application Data

(63) Continuation of application No. 10/886,830, filed on Jul. 7, 2004, now Pat. No. 7,529,171.

(30) Foreign Application Priority Data

Jul. 8, 2003    (JP) .............................. 2003-272084

(51) Int. Cl.
*G11B 7/00*    (2006.01)
(52) U.S. Cl. .................................. 369/275.3
(58) Field of Classification Search ............. 369/275.3, 369/275.2, 275.1, 47.27, 47.1, 53.24
See application file for complete search history.

(56) References Cited

U.S. PATENT DOCUMENTS

| | | | |
|---|---|---|---|
| 4,791,623 A | 12/1988 | Deiotte | |
| 5,442,611 A | 8/1995 | Hosaka | |
| 5,613,112 A | 3/1997 | Nagashima | |
| 5,825,726 A | 10/1998 | Hwang et al. | |
| 6,243,340 B1 | 6/2001 | Ito et al. | |
| 6,359,844 B1 | 3/2002 | Frank | |
| 6,599,607 B1 | 7/2003 | Takishita et al. | |
| 6,621,783 B1 | 9/2003 | Murata | |
| 6,728,186 B2 | 4/2004 | Weijenbergh et al. | |
| 6,785,196 B2 | 8/2004 | Bakx et al. | |
| 6,918,003 B2 | 7/2005 | Sasaki | |

FOREIGN PATENT DOCUMENTS

EP    1083748    3/2001

(Continued)

OTHER PUBLICATIONS

Decision on Grant dated Apr. 29, 2008 for a corresponding Russian Patent Application No. 2005140311 and a partial English translation thereof.

(Continued)

*Primary Examiner*—Nabil Z Hindi
(74) *Attorney, Agent, or Firm*—Renner, Otto, Boisselle & Sklar, LLP

(57) ABSTRACT

A write-once recording medium is provided, which comprises a management information area for recording management information for managing a recorded state, and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session.

3 Claims, 23 Drawing Sheets

FOREIGN PATENT DOCUMENTS

| | | |
|---|---|---|
| EP | 1321940 | 6/2003 |
| JP | 2001-148166 | 5/2001 |
| TW | 526480 | 4/2003 |
| WO | 02/31819 | 4/2002 |

OTHER PUBLICATIONS

International Search Report for corresponding Application No. PCT/JP2004/010007 Mailed Jan. 26, 2005.

"Mt. Fuji Commands for Multimedia Devices SFF8090i v5", SFF Committee Specification, 'Online! May 29, 2003, XP 002313243.

Russian Office Action for corresponding Application No. 2005140311 dated Sep. 5, 2007 (including partial English translation).

Copending Parent U.S. Appl. No. 10/886,830, filed Jul. 7, 2004 (Allowed claims provided).

Copending Sibling U.S. Appl. No. 12/408,753 filed Mar. 23, 2009 (copy of claims being submitted herewith).

| 10 |
|---|
| 1 |
| 0 |
| 0 |

| | 12 Start position 13 | | Last recorded position 14 |
|---|---|---|---|
| #1 | 1 | P1 | 0 |
| #2 | 0 | 0 | 0 |
| #3 | 0 | 0 | 0 |

(b)

| 10 |
|---|
| 2 |
| 1 |
| 0 |

| | 12 Start position 13 | | Last recorded position 14 |
|---|---|---|---|
| #1 | 1 | P1 | 0 |
| #2 | 0 | P3 | 0 |
| #3 | 0 | 0 | 0 |

(c)

| 10 |
|---|
| 3 |
| 2 |
| 1 |

| | 12 Start position 13 | | Last recorded position 14 |
|---|---|---|---|
| #1 | 1 | P1 | 0 |
| #2 | 0 | P3 | 0 |
| #3 | 0 | P5 | 0 |

(d)

| 10 |
|---|
| 3 |
| 2 |
| 1 |

| | 12 Start position 13 | | Last recorded position 14 |
|---|---|---|---|
| #1 | 1 | P1 | P2 − 1 |
| #2 | 0 | P3 | P4 − 1 |
| #3 | 0 | P5 | 0 |

(e)

| 10 |
|---|
| 3 |
| 2 |
| 0 |

| | 12 Start position 13 | | Last recorded position 14 |
|---|---|---|---|
| #1 | 1 | P1 | P2 − 1 |
| #2 | 0 | P3 | P4 − 1 |
| #3 | 0 | P5 | 0 |

(f)

| 10 |
|---|
| 3 |
| 0 |
| 0 |

| | 12 Start position 13 | | Last recorded position 14 |
|---|---|---|---|
| #1 | 1 | P1 | P2 − 1 |
| #2 | 0 | P3 | P4 − 1 |
| #3 | 0 | P5 | 0 |

(g)

| 10 |
|---|
| 3 |
| 0 |
| 0 |

| | 12 Start position 13 | | Last recorded position 14 |
|---|---|---|---|
| #1 | 1 | P1 | P2 − 1 |
| #2 | 0 | P3 | P4 − 1 |
| #3 | 1 | P5 | 0 |

| 10 |
|---|
| 3 |
| 0 |
| 0 |

| 12 | | Start position 13 | Last recorded position 14 |
|---|---|---|---|
| #1 | 1 | P1 | P2 |
| #2 | 0 | P3 | P4 |
| #3 | 1 | P5 | 0 |
| #4 | 0 | 0 | 0 |
| #5 | 0 | 0 | 0 |

(h)

| 10 |
|---|
| 4 |
| 3 |
| 0 |

| 12 | | Start position 13 | Last recorded position 14 |
|---|---|---|---|
| #1 | 1 | P1 | P2 − 1 |
| #2 | 0 | P3 | P4 − 1 |
| #3 | 1 | P5 | 0 |
| #4 | 0 | P6 | 0 |
| #5 | 0 | 0 | 0 |

(i)

| 10 |
|---|
| 4 |
| 3 |
| 0 |

| 12 | | Start position 13 | Last recorded position 14 |
|---|---|---|---|
| #1 | 1 | P1 | P2 − 1 |
| #2 | 0 | P3 | P4 − 1 |
| #3 | 1 | P5 | P7 − 1 |
| #4 | 0 | P6 | P8 − 1 |
| #5 | 0 | 0 | 0 |

(j)

| 10 |
|---|
| 4 |
| 0 |
| 0 |

| 12 | | Start position 13 | Last recorded position 14 |
|---|---|---|---|
| #1 | 1 | P1 | P2 − 1 |
| #2 | 0 | P3 | P4 − 1 |
| #3 | 1 | P5 | P7 − 1 |
| #4 | 0 | P6 | P8 − 1 |
| #5 | 0 | 0 | 0 |

(k)

| 10 |
|---|
| 5 |
| 0 |
| 0 |

| 12 | | Start position 13 | Last recorded position 14 |
|---|---|---|---|
| #1 | 1 | P1 | P2 − 1 |
| #2 | 0 | P3 | P4 − 1 |
| #3 | 1 | P5 | P7 − 1 |
| #4 | 0 | P6 | P8 − 1 |
| #5 | 0 | P8 | 0 |

(l)

| 10 |
|---|
| 5 |
| 0 |
| 0 |

| 12 | | Start position 13 | Last recorded position 14 |
|---|---|---|---|
| #1 | 1 | P1 | P2 − 1 |
| #2 | 0 | P3 | P4 − 1 |
| #3 | 1 | P5 | P7 − 1 |
| #4 | 0 | P6 | P8 − 1 |
| #5 | 1 | P8 | 0 |

| 10 |
|---|
| 5 |
| 0 |
| 0 |

| 15 | | Start position 13 | Last recorded position 14 |
|---|---|---|---|
| #1 | 1 | P1 | P2 − 1 |
| #2 | 1 | P3 | P4 − 1 |
| #3 | 0 | P5 | P7 − 1 |
| #4 | 0 | P6 | P8 − 1 |
| #5 | 1 | P8 | 0 |

| | 10 | | 16 | | Start position 13 | Last recorded position 14 |
|---|---|---|---|---|---|---|
| | 5 | | 1 | #1 | P1 | P2 − 1 |
| | 0 | | 3 | #2 | P3 | P4 − 1 |
| | 0 | | 5 | #3 | P5 | P7 − 1 |
| | | | 0 | #4 | P6 | P8 − 1 |
| | | | 0 | #5 | P8 | 0 |

FIG. 23

| Byte | contents |
|---|---|
| 0 ~ 3 | Start Sector Number of Border-out #1 |
| 4 ~ 7 | Start Sector Number of Border-out #2 |
| 8 ~ 11 | Start Sector Number of Border-out #3 |
| : | : |
| 2036 ~ 2039 | Start Sector Number of Border-out #510 |
| 2040 ~ 2043 | Start Sector Number of Border-out #511 |
| 2044 ~ 2047 | Start Sector Number of Border-out #512 |

FIG. 24

| Byte | contents |
|---|---|
| 0 ~ 1 | Invisible/Incomplete RZone Number (Last RZone Number) |
| 2 ~ 3 | Current Appendable Reserved RZone Number 1 |
| 4 ~ 5 | Current Appendable Reserved RZone Number 2 |
| 6 ~ 15 | Reserved |
| 16 ~ 19 | Start Sector Number of RZone #1 |
| 20 ~ 23 | Last Recorded Address of RZone #1 |
| 24 ~ 27 | Start Sector Number of RZone #2 |
| 28 ~ 31 | Last Recorded Address of RZone #2 |
| : | : |
| 2032 ~ 2035 | Start Sector Number of RZone #253 |
| 2036 ~ 2039 | Last Recorded Address of RZone #253 |
| 2040 ~ 2043 | Start Sector Number of RZone #254 |
| 2044 ~ 2047 | Last Recorded Address of RZone #254 |

FIG. 25

| Byte | contents |
|---|---|
| 0 ~ 3 | Start Sector Number of RZone #n |
| 4 ~ 7 | Last Recorded Address of RZone #n |
| 8 ~ 11 | Start Sector Number of RZone #(n+1) |
| 12 ~ 15 | Last Recorded Address of RZone #(n+1) |
| : | : |
| 2032 ~ 2035 | Start Sector Number of RZone #(n+254) |
| 2036 ~ 2039 | Last Recorded Address of RZone #(n+254) |
| 2040 ~ 2043 | Start Sector Number of RZone #(n+255) |
| 2044 ~ 2047 | Last Recorded Address of RZone #(n+255) |

WRITE-ONCE RECORDING MEDIUM, RECORDING METHOD, RECORDING APPARATUS, REPRODUCTION METHOD, AND REPRODUCTION APPARATUS

This application is a Continuation of U.S. patent application Ser. No. 10/886,830 filed Jul. 7, 2004 now U.S. Pat. No. 7,529,171, and is related to co-pending sibling application U.S. application Ser. No. 12/408,753 filed on Mar. 23, 2009, the entire contents of which are hereby incorporated by reference.

BACKGROUND OF THE INVENTION

1. Field of the Invention

The present invention relates to a write-once recording medium comprising a management information area for recording management information for managing a recorded state and a user data area for recording user data, and a method and apparatus for recording data onto the write-once recording medium, and a method and apparatus for reproducing data from the write-once recording medium.

2. Description of the Related Art

Optical discs are information recording media that are compatible between a plurality of apparatuses. Examples of optical discs include, for example, the CD which was originally developed for recording music and recently are widely used for recording data, DVD which was developed for recording digital video and are rapidly becoming widespread, and next-generation optical discs which are currently being developed for recording high-quality video, such as for high-definition television or the like.

These optical discs are roughly categorized into three groups in terms of the recording/reproduction method: a read-only type; a write-once type; and a rewritable type. Write-once optical discs are made of a recording material, from which recorded data cannot be erased. Data can be recorded once in the same place on the medium. For example, CD-R and DVD-R are write-once optical discs. Write-once optical discs are also referred to as write-once-many-read optical discs. For rewritable optical discs, data can be recorded many times in the same place on the medium. For example, CD-RW and DVD-RAM are rewritable optical discs.

Write-once optical discs are not rewritable due to the characteristics of the recording material. Therefore, it is necessary to manage recorded areas and unrecorded areas. In a CD-R, the recording start position and the last recorded position of each music composition are managed so as to incrementally record in units of a music composition. The unit of a music composition is called a track (hereinafter also referred to as a "TRACK" so as to distinguish it from a track indicating a groove). In a CD-R, data is recorded sequentially in units of a track from its inner periphery to its outer periphery. A plurality of recorded TRACKs are managed as a session including a plurality of recorded TRACKs (hereinafter referred to as a "SESSION"). An area for storing management information for managing a recorded state is called a program management area (hereinafter also referred to as a "PMA").

For DVD-R, an RZone (corresponding to a TRACK of CD), a Border (corresponding to a SESSION of CD), and a recording management area (hereinafter also referred to as an "RMA"; corresponding to a PMA of CD) are defined (for example, SFF 8090i standard, "Mt. Fuji Command for Multimedia Devices", Section 4.16 entitled "Recording for DVD-R media").

There is a technique for applying a method for managing areas allocated on DVD-R compatibly to read-only DVD-ROM (for example, Japanese Laid-Open Publication No. 2001-148166).

In a data structure recorded in an RMA of DVD-R, a recording management data (hereinafter also referred to as an "RMD") is defined.

FIG. 23 shows a field 3 of an RMD. The field 3 of an RMD stores information indicating the positions of a maximum of 512 Borders (corresponding to a SESSION of CD).

FIG. 24 shows a field 4 of an RMD. FIG. 25 shows fields 5 to 12 of an RMD. The field 4, and the fields 5 to 12 of an RMD store information indicating the positions of a maximum of 2302 RZone's (corresponding to a TRACK of CD).

However, in conventional techniques for managing recording areas, the number of recording areas to be managed is currently already large. If the conventional techniques are applied without modification to a larger capacity of future media, management information is adversely enlarged.

SUMMARY OF THE INVENTION

According to an aspect of the present invention, a write-once recording medium is provided, comprising: a management information area for recording management information for managing a recorded state; and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session.

In one embodiment of this invention, the identification information is a flag provided to the recording area. The flag has either a value of "0" or a value of "1".

In one embodiment of this invention, the flag having a value of "1" is provided to the recording area located at the beginning of the session.

In one embodiment of this invention, the value of the flag provided to the recording area contained in a session of the at least one session is inverse to the value of the flag provided to the recording area of another session of the at least one session adjacent to that session.

In one embodiment of this invention, a distinct number is provided to the at least one recording area. The identification information is an array containing a number provided to the recording area located at the beginning of the session.

According to another aspect of the present invention, a recording method for a write-once recording medium is provided. The medium comprises: a management information area for recording management information for managing a recorded state; and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session. The method comprises the steps of: (a) generating the management information; and (b) recording the management information into the management information area.

In one embodiment of this invention, the step of (a) comprises generating the management information so that at least one of the at least one recording area is divided into two recording areas.

In one embodiment of this invention, the step of (a) comprises generating the management information so that recording is disabled.

In one embodiment of this invention, before the step of (a), it is determined whether or not the number of the at least one recording area is less than a predetermined value M, where M is an integer of 2 or more.

In one embodiment of this invention, the step of (a) comprises dividing an outermost recording area of the at least one recording area into two where the end of recorded portion of the outermost recording area is a boundary, and generating the management information so that recording is disabled from the beginning to the end of recorded portion of the outermost recording area.

In one embodiment of this invention, the step of (a) further comprises, when a boundary of the session is newly added, determining whether or not a recording area of the at least one recording area containing a sector having a maximum sector number has been recorded.

According to another aspect of the present invention, a recording apparatus for a write-once recording medium is provided. The medium comprises: a management information area for recording management information for managing a recorded state; and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session. The apparatus comprises: (a) a section for generating the management information; and (b) a section for recording the management information into the management information area.

According to another aspect of the present invention, a reproduction method for a write-once recording medium is provided. The medium comprises: a management information area for recording management information for managing a recorded state; and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session. The method comprises the steps of: (a) reading the management information from the management information area; and (b) recognizing information regarding the session based on the management information read out.

In one embodiment of this invention, the step of (b) comprises: (b-1) obtaining the total number of the at least one session based on the management information read out; (b-2) obtaining a recording area of the at least one recording area located at the beginning of a last session of the at least one session; and (b-3) obtaining a session of the at least one session belonging to a predetermined recording area of the at least one recording area.

In one embodiment of this invention, the identification information is a flag provided to the at least one recording area. The flag has either a value of "0" or a value of "1". The flag having a value of "1" is provided to a recording area of the at least one recording area located at the beginning of each of the at least one session. The step of (b-1) comprises obtaining the total number of the at least one session based on the flag having a value of "1". The step of (b-2) comprises obtaining a recording area of the at least one recording area located at the beginning of a last session of the at least one session based on a last flag of the flag(s) having a value of "1". A distinct number is provided to each of the at least one session. The step of (b-3) comprises obtaining a number provided to a session of the at least one session to which the predetermined recording area belongs, based on the number of the flag(s) having a value of "1" of the flag(s) over the range from a recording area of the at least one recording area located at the beginning of a leading session of the at least one session to the predetermined recording area.

In one embodiment of this invention, the identification information is a flag provided to the recording area. The flag has either a value of "0" or a value of "1". The value of the flag provided to the recording area contained in a session of the at least one session is inverse to the value of the flag provided to the recording area of another session of the at least one session adjacent to that session. The step of (b-1) comprises obtaining the total number of the at least one session based on the number of inversions of the value(s) of the flag(s). The step of (b-2) comprises obtaining a recording area of the at least one recording area located at the beginning of a last session of the at least one session, based on the flag having the last inverted value. A distinct number is provided to each of the at least one session. The step of (b-3) comprises obtaining a number provided to a session of the at least one session to which the predetermined recording area belongs, based on the number of inversions of the value(s) of the flag(s) over the range from a recording area of the at least one recording area located at the beginning of a leading session of the at least one session to the predetermined recording area.

In one embodiment of this invention, a distinct number is provided to each of the at least one recording area. The identification information is an array of a number(s) provided to a recording area of the at least one recording area located at the beginning of each of the at least one session. The step of (b-1) comprises obtaining the total number of the number(s) contained in the array. The step of (b-2) comprises obtaining a recording area of the at least one recording area located at the beginning of a last session, based on a last number of the number(s) contained in the array. A distinct number is provided to each of the at least one session. The step of (b-3) comprises obtaining a number provided to a session of the at least one session to which the predetermined recording area belongs, based on the number of number(s) smaller than the number provided to the predetermined recording area contained in the array.

According to another aspect of the present invention, a reproduction apparatus for a write-once recording medium is provided. The medium comprises: a management information area for recording management information for managing a recorded state; and a user data area for recording user data. The user data area is configured to contain at least one recording area. At least one session is configured to contain at least one of the at least one recording area. The management information contains range information indicating a recording range of the at least one recording area and identification information for identifying the recording area located at a boundary of the session. The apparatus comprises: (a) a section for reading out the management information from the management information area; and (b) a section for recognizing information regarding the at least one session based on the management information read out.

Thus, according to the write-once recording medium of the present invention, one session is comprised of at least one of the at least one recording area, and management information contains identification information for identifying a recording area located at a boundary of a session. Therefore, a boundary of a session can be identified based on only a recording area located at the beginning of a session. As a result, the size of information for identifying a boundary of a session can be reduced.

In addition, according to the write-once recording medium of the present invention, management information can contain information indicating a recording area located at the beginning of a session, thereby making it possible to reduce the size of the management information. Therefore, if the size of an area for incrementally writing management information is the same, the number of times with which the user can incrementally write management information can be increased. If the number of times with which the user can incrementally write management information is the same, the size of an area for incrementally writing management information can be reduced. As a result, a capacity for recording user data can be increased.

According to the recording method and the recording apparatus of the present invention, it is possible to record/reproduce management information onto/from the write-once recording medium of the present invention. Since management information can be recorded onto the write-once recording medium having only a small size of area for recording management information, the time required for searching for the latest management information can be reduced. As a result, the time required from when the user loads the write-once recording medium into an apparatus to when a user data area of the write-once recording medium is ready to access, can be reduced.

Thus, the invention described herein makes possible the advantages of providing a write-once recording medium having a smaller size of management information and a larger capacity; a method and apparatus for recording data to the write-once recording medium; and a method and apparatus for reproducing data from the write-once recording medium.

These and other advantages of the present invention will become apparent to those skilled in the art upon reading and understanding the following detailed description with reference to the accompanying figures.

BRIEF DESCRIPTION OF THE DRAWINGS

FIG. 4 is a diagram showing a transition of the contents of entry number array 10 and recording area entry 11.

FIG. 6 is a diagram showing a transition of the contents of the entry number array 10 and the recording area entry 11.

FIG. 8 is a diagram showing a transition of the contents of the entry number array 10 and the recording area entry 11.

FIG. 10 is a diagram showing a transition of the contents of the entry number array 10 and the recording area entry 11.

FIG. 23 is a diagram showing a field 3 of an RMD.

FIG. 24 is a diagram showing a field 4 of an RMD.

FIG. 25 is a diagram showing fields 5 to 12 of an RMD.

DESCRIPTION OF THE PREFERRED EMBODIMENTS

Hereinafter, embodiments of the present invention will be described in the following sections (1. Write-once recording medium), (2-1. Recording apparatus), (2-2. Recording method), (3-1. Reproduction apparatus), and (3-2. Reproduction method) with reference to the accompanying drawings.

1. Write-Once Recording Medium

Figure 1:
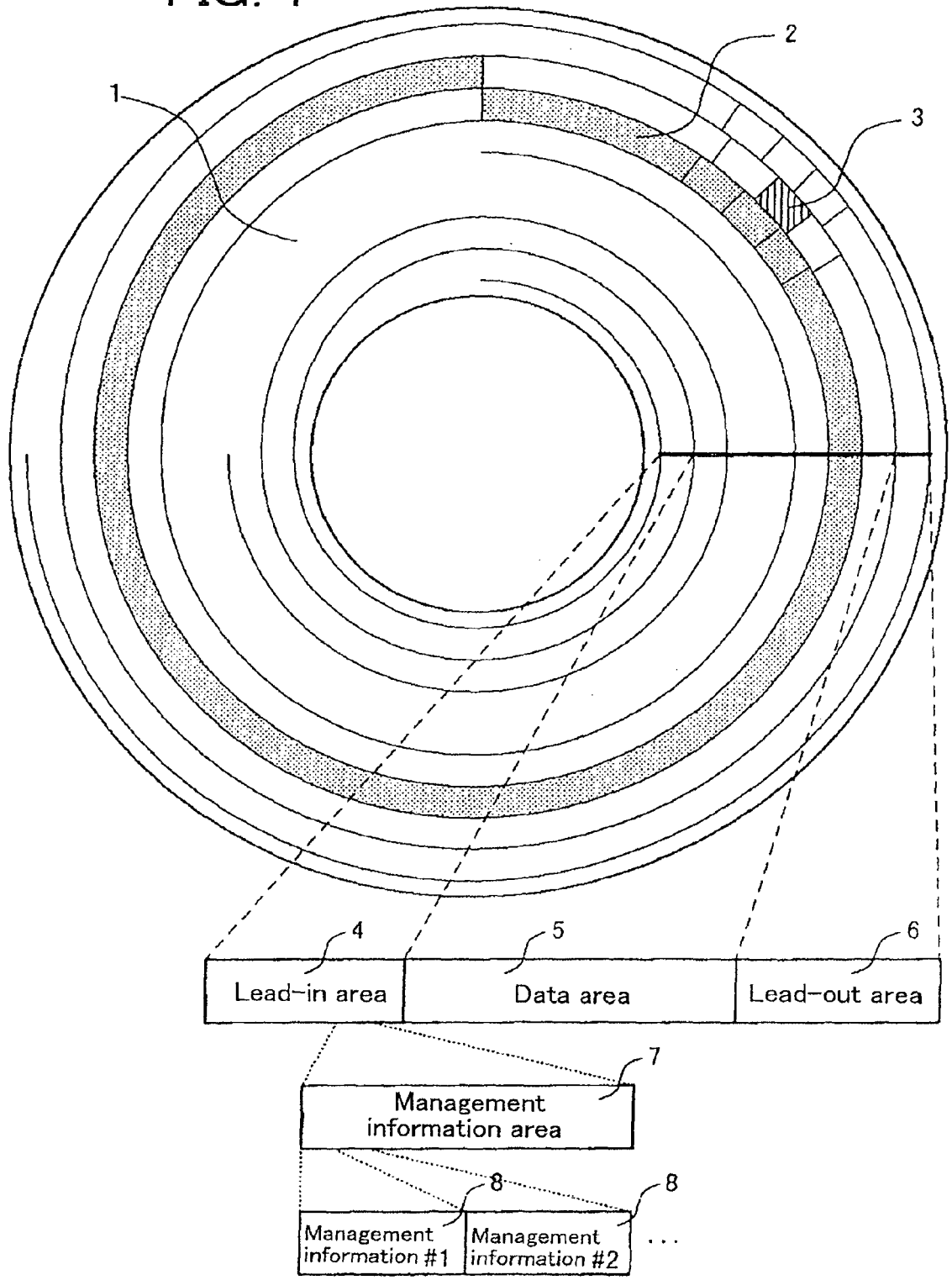
FIG. 1 is a diagram showing a structure of an optical disc 1 according to an embodiment of the present invention.

FIG. 1 shows a structure of an optical disc 1 according to an embodiment of the present invention.

The optical disc 1 is in the shape of a disc. In the optical disc 1, a spiral track groove 2 is provided. In the track groove 2, a plurality of blocks 3 are provided. The block 3 is a unit for error correction as well as a unit for recording/reproduction of information.

The optical disc 1 has a lead-in area 4, a lead-out area 6, and a data area 5 for recording user data. The data area 5 is configured to have at least one recording area. Recording/reproduction of data is performed with respect to the data area 5.

The lead-in area 4 and the lead-out area 6 serve as margins which allows an optical head (not shown) to follow the track groove 2 when the optical head accesses an end of the data area 5 and overruns the data area 5.

The lead-in area 4 has a management information area 7 for recording management information 8 for managing a recorded state. A plurality of pieces of management information 8 may be, for example, used to manage a recorded area and an unrecorded area. A plurality of pieces of management information 8 are each recorded in at least one block 3.

Figure 2:
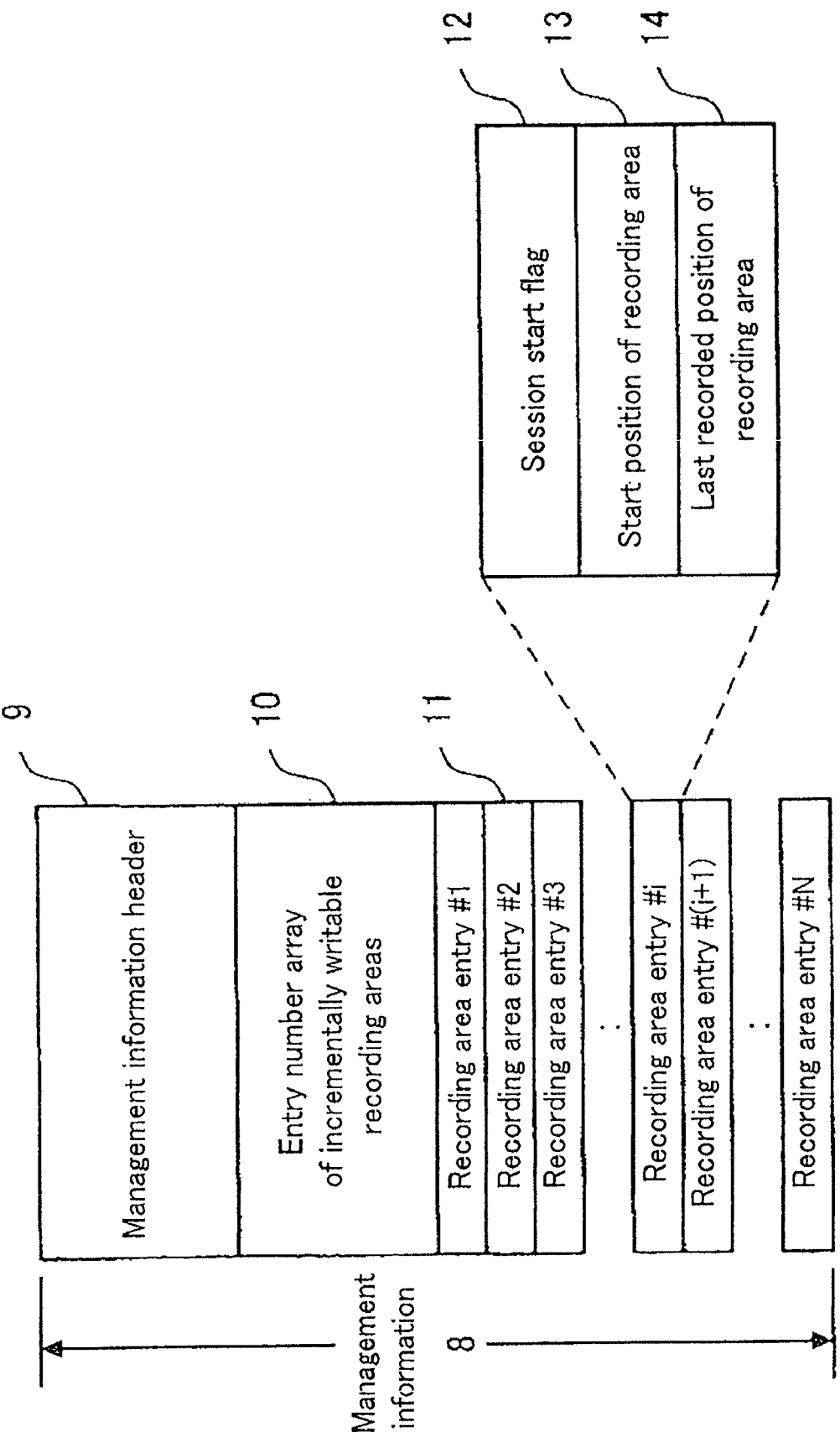
FIG. 2 is a diagram showing a data structure of management information 8 according to an embodiment of the present invention.

FIG. 2 shows a data structure of the management information 8 according to an embodiment of the present invention.

Each management information 8 contains a management information header 9 for identifying one of a plurality of pieces of management information 8, an entry number array 10 of incrementally writable recording areas, and a plurality of recording area entries 11. The entry number array 10 is information for identify a recording area, in which data can be recorded.

Each recording area entry 11 contains identification information for identifying a recording area located at a boundary of a session, and range information indicating a recording range of at least one recording area.

The identification information is, for example, a session start flag 12 which indicates which of the recording area entries 11 is a boundary (e.g., the beginning or the like) of a session. A session start flag 12 is given to at least one recording area, having a value of "0" or "1". For example, a session start flag 12 having a value of "1" is given to a recording area located at a boundary (e.g., the beginning or the like) of a session. In each recording area entry 11, a number (1 to N) following # indicates an entry number. Thus, at least one recording areas are each given distinct entry numbers N is an integer of 1 or more. One session is comprised of at least one of the recording areas.

Range information contains, for example, a start position 13 and a last recorded position 14 of a recording area.

Thus, the recording area of the present invention corresponds to the TRACK of CD-R and the RZone of DVD-R. The session of the present invention corresponds to the SESSION of CD-R and the Border of DVD-R. The session of the present invention contains none of the lead-in area 4, the lead-out area 6, a Border-In area (not shown), and a Border-Out area (not shown) (see FIG. 3 described below). Therefore, the entry number array 10 corresponds to information from Byte 0 to Byte 5 (FIG. 24). The recording area entries 11 correspond to information obtained by adding the session start flag 12 to information of Byte 16 and thereafter (FIG. 24) and from Byte 0 to Byte 2047 (FIG. 25).

In DVD-R (a conventional write-once medium), 2048 bytes of management information is required for management of a maximum of 512 Borders (corresponding to a session of the present invention) (FIG. 23). In the present invention, one bit of the recording area entry 11 is allocated to the session start flag 12, thereby making it possible to manage a session.

Hereinafter, session management according to an embodiment of the present invention will be described below.

Figure 3:
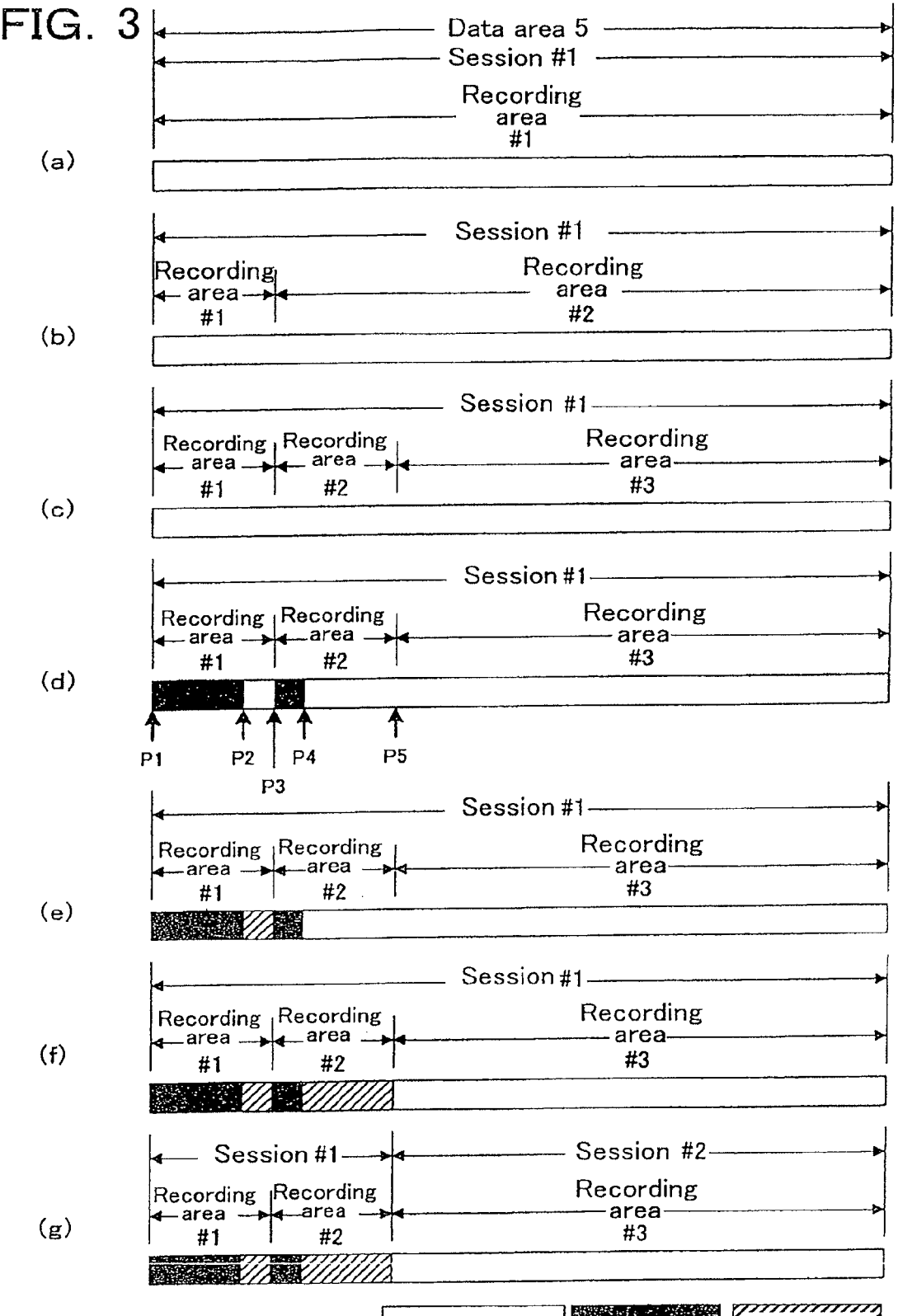
FIG. 3 is a diagram showing a transition from an unrecorded area, a recorded area, to a 0-padding recorded area on the optical disc 1.

FIG. 3 shows a transition from an unrecorded area, a recorded area, to a 0-padding recorded area on the optical disc 1. In FIG. 3, the unrecorded area of the optical disc 1 has a white background color, the recorded area has a black background color, and the 0-padding recorded area is hatched.

FIG. 4 shows a transition of the contents of the entry number array 10 and the recording area entry 11.

Portion (a) of FIG. 3 and portion (a) of FIG. 4 show concurrent states. Portion (b) of FIG. 3 and portion (b) of FIG. 4 show concurrent states. Similarly, portion (c) to portion (g) of FIG. 3 and corresponding portion (c) to portion (g) of FIG. 4 show concurrent states.

Portion (a) of FIG. 3 and portion (a) of FIG. 4 show an initial state of the optical disc 1.

The data area 5 is configured to contain a recording area #1. The session #1 contains a recording area #1. No information has been recorded in the recording area #1.

In the entry number array 10, a number "1" is registered which indicates that the recording area #1 is incrementally writable. In another portion of the entry number array 10, a number "0" is registered which indicates that there is no incrementally writable recording area other than the recording area #1.

In the recording area entry #1, the session start flag 12 is set to be a value of "1", the start position 13 of the recording area #1 is set to be a position P1, and the last recorded position 14 of the recording area #1 is set to be a value of "0" which indicates an unrecorded state. The position P1 indicates the beginning of the data area 5. In a recording area entry #2 and a recording area entry #3, the session start flag 12, the start position 13, and the last recorded position 14 of the recording area #2 and the recording area #3 are set to be "0" so as to indicate that there is no corresponding recording area.

Portions (b) of FIGS. 3 and 4 show a state of the data area after a RESERVE TRACK command has been received from a higher-level control apparatus. The RESERVE TRACK command indicates reservation of a recording area. Note that commands from a higher-level control apparatus (for example, a RESERVE TRACK command) are defined in a general host command standard (see, for example, see SFF 8090i standard, "Mt. Fuji Command for Multimedia Devices", Section 4.16 entitled "Recording for DVD-R media").

The management information 8 is generated (or changed) to indicate that the recording area #1 from the position P1 to the end of the data area 5 is divided into a recording area #1 from the position P1 to a position P3 and a recording area #2 from the position P3 to the end of the data area 5. The recording area #1 and the recording area #2 belong to the session #1. P3 is a value obtained by adding a size designated by the RESERVE TRACK command to P1. In the data area 5, there is no recorded area.

In the entry number array 10, a number "1" indicating that the recording area #1 is incrementally writable and a number "2" indicating that the recording area #2 is incrementally writable, are registered. In the entry number array 10, entry numbers are sorted in the descending order. Note that the sorting order of the entry number array 10 is not limited to the descending order, and the sorting may be performed in the ascending order or may not be performed.

In the recording area entry #2, the session start flag 12 of the recording area #2 is set to be a value of "0", and the start position 13 of the recording area #2 is set to be the position P3.

Hereinafter, the contents of management information which have no change are not described for the sake of brevity.

Portions (c) of FIGS. 3 and 4 show a state of the data area 5 after the RESERVE TRACK command has been received from the higher-level control apparatus.

The management information 8 is generated (or changed) to indicate that the recording area #2 from the position P3 to the end of the data area 5 is divided into a recording area #2 from the position P3 to a position P5 and a recording area #3 from the position P5 to the end of the data area 5. The recording area #1 is not changed. The recording area #1, the recording area #2, and the recording area #3 belong to the session #1. P5 has a value obtained by adding a size designated by the RESERVE TRACK command to P3. In the data area 5, there is no recorded area.

In the entry number array 10, in order to indicate that the recording area #3 has been added, a number "3" is added which indicates that the recording area #3 is incrementally writable.

In the recording area entry #3, the session start flag 12 of the recording area #3 is set to be a value of "0", and the start position 13 of the recording area #3 is set to be the position P5.

Portions (d) of FIGS. 3 and 4 show a state of the data area 5 after a WRITE command has been received from a higher-level control apparatus. The WRITE command indicates recording of data into the recording area #1 and the recording area #2.

By recording data into the recording area #1, the last recorded position 14 of the recording area #1 is changed into a position (P2−1). By recording data into the recording area #2, the last recorded position 14 of the recording area #2 is changed into a position (P4−1).

Note that since the last recorded position 14 is defined as the position of a recorded block 3, the last recorded position 14 is a position obtained by subtracting 1 from the position P2 or a position by subtracting 1 from the position P4. However, for example, if the last recorded position 14 is defined as the position of the next recorded block 3, it is not necessary to subtract 1. For the sake of convenience, hereinafter, session management according to an embodiment of the present invention will be descried below, while the last recorded position 14 is defined as the position of a recorded block 3.

In the recording area entry #1, the last recorded position 14 of the recording area #1 is set to be the position (P2−1). In the recording area entry #2, the last recorded position 14 of the recording area #2 is set to be the position (P4−1).

Portions (e) of FIGS. 3 and 4 show a state of the data area 5 after a CLOSE TRACK/SESSION command for a designated TRACK (the recording area #1 is designated) has been received from a higher-level control apparatus. The CLOSE TRACK/SESSION command for a designated TRACK (the recording area #1 is designated) indicates that it is no longer necessary to record further information into the recording area #1.

0-padding data is recorded into an unrecorded area of the recording area #1 (an area from the position P2 to the position P3), and the recording area #1 becomes closed. In order to indicate that the recording area #1 is not incrementally writable, the number "1" is removed from the entry number array 10.

Portions (f) of FIGS. 3 and 4 show a state of the data area 5 after a CLOSE TRACK/SESSION command for a designated TRACK (the recording area #2 is designated) has been received from a higher-level control apparatus. The CLOSE TRACK/SESSION command for a designated TRACK (the recording area #2 is designated) indicates that it is no longer necessary to record further information into the recording area #2.

0-padding data is recorded into an unrecorded area of the recording area #2 (an area from the position P4 to the position P5), and the recording area #2 becomes closed. In order to indicate that the recording area #2 is not incrementally writable, the number "2" is removed from the entry number array 10.

Portions (g) of FIGS. 3 and 4 show a state of the data area 5 after a CLOSE TRACK/SESSION command for a designated a SESSION (the session #1 is designated) has been received from a higher-level control apparatus.

The closed recording area #1 and the closed recording area #2 belong to the session #1, while the recording area #3 having no recorded information belongs to the session #2.

In the recording area entry #3, the session start flag 12 is set to be a value of "1". Thus, the session start flag 12 is given to a plurality of recording areas, which has any one of a value of "0" and a value of "1". The session start flag 12 having a value of "1" is given to a recording area located at the beginning of a session.

Figure 5:
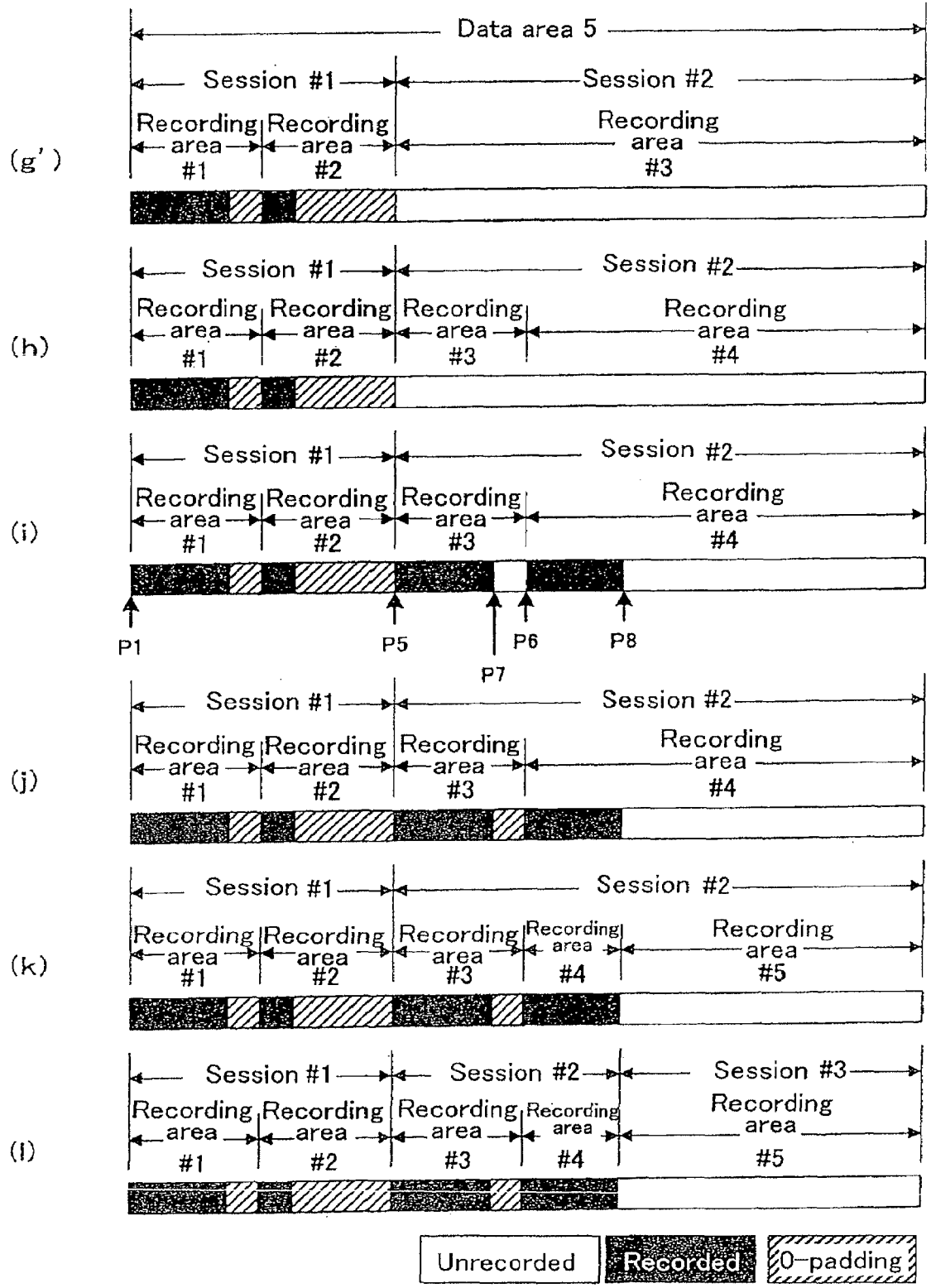
FIG. 5 is a diagram showing a transition from an unrecorded area, a recorded area, to a 0-padding recorded area on the optical disc 1.

FIG. 5 shows a transition from an unrecorded area, a recorded area, to a 0-padding recorded area on the optical disc 1. In FIG. 5, the unrecorded area of the optical disc 1 has a white background color, the recorded area has a black background color, and the 0-padding recorded area is hatched.

FIG. 6 shows a transition of the contents of the entry number array 10 and the recording area entry 11.

FIG. 5 shows what follows FIG. 3. FIG. 6 shows what follows FIG. 4.

Portions (g') of FIGS. 5 and 6 show concurrent states. Portion (h) of FIGS. 5 and 6 show concurrent states. Similarly, portions (i) to (l) of FIG. 5 and corresponding portions (i) to (l) of FIG. 6 show concurrent states. Portion (g') of FIG. 5 shows the same state as that of portion (g) of FIG. 3. Portion (g') of FIG. 6 shows the same state as that of portion (g) of FIG. 4. Therefore, Portions (g') of FIGS. 5 and 6 are not described.

Portions (h) of FIGS. 5 and 6 show a state of the data area 5 after a RESERVE TRACK command has been received from a higher-level control apparatus.

The management information 8 is generated (or changed) to indicate that the recording area #3 from the position P5 to the end of the data area 5 is divided into a recording area. #3 from the position P5 to a position P6 and a recording area #4 from the position P6 to the end of the data area 5. The recording area #1 and the recording area #2 are not changed. The recording area #1 and the recording area #2 belong to the session #1. The recording area #3 and the recording area #4 belong to a session #2. P6 is a value obtained by adding a size designated by the RESERVE TRACK command to P5.

In the entry number array 10, a number "4" indicating that the recording area #4 is incrementally writable, is registered to indicate that the recording area #4 has been added.

In the recording area entry #4, the session start flag 12 of the recording area #4 is set to have a value of "0", while the start position 13 of the recording area #4 is set to be the position P6.

Portions (i) of FIGS. 5 and 6 show a state of the data area 5 after a WRITE command has been received from a higher-level control apparatus. The WRITE command indicates recording of data into the recording area #3 and the recording area #4.

By recording data into the recording area #3, the last recorded position 14 of the recording area #3 is changed into a position (P7−1). By recording data into the recording area #4, the last recorded position 14 of the recording area #4 is changed into a position (P8−1).

In the recording area entry #3, the last recorded position 14 of the recording area #3 is set to be the position (P7−1). In the recording area entry #4, the last recorded position 14 of the recording area #4 is set to be the position (P8−1).

Portions (j) of FIGS. 5 and 6 show a state of the data area 5 after a CLOSE TRACK/SESSION command for a designated TRACK (the recording area #3 is designated) has been received from a higher-level control apparatus. The CLOSE TRACK/SESSION command for a designated TRACK (the recording area #3 is designated) indicates that it is no longer necessary to record further information into the recording area #3.

0-padding data is recorded into an unrecorded area of the recording area #3 (an area from the position P7 to the position P6), and the recording area #3 becomes closed. In order to indicate that the recording area #3 is not incrementally writable, the number "3" is removed from the entry number array 10.

Portions (k) of FIGS. 5 and 6 show a state of the data area 5 after a CLOSE TRACK/SESSION command for a designated TRACK (the recording area #4 is designated) has been received from a higher-level control apparatus. The CLOSE TRACK/SESSION command for a designated TRACK (the recording area #4 is designated) indicates that it is no longer necessary to record further information into the recording area #4.

The recording area #4 from the position P6 to the end of the data area 5 is an outermost recording area. Therefore, the management information 8 is generated (or changed) to indicate that the recording area #4 from the position P6 to the end of the data area 5 is divided into a recording area #4 from the position P6 to a position P8 and a recording area #5 from the position P8 to the end of the data area 5. The recording area #4 becomes closed. The recording area #1, the recording area #2, and the recording area #3 are not changed.

In order to indicate that the recording area #4 is not incrementally writable, the number "4" is removed from the entry number array 10. In order to indicate that the recording area #5 has been added, a number "5" is added into the entry number array 10, which indicates that the recording area #5 is incrementally writable.

Portions (l) of FIGS. 5 and 6 show a state of the data area 5 after a CLOSE TRACK/SESSION command for a designated SESSION (the session #2 is designated) has been received from a higher-level control apparatus.

The closed recording area #3 and the closed recording area #4 belong to the session #2, while the recording area #5 having no recorded information belongs to the session #3.

In the recording area entry #5, the session start flag 12 is set to be a value of "1".

Thereafter, steps similar to those which are described with reference to portions (g') to (l) of FIGS. 5 and 6 are repeatedly performed until all of desired user data are recorded.

A READ DISC INFORMATION command and a READ TRACK INFORMATION command are commands which are issued from a higher-level control apparatus to inquire the state of a SESSION and the state of a TRACK, respectively (for example, SFF 8090i standard, "Mt. Fuji Command for Multimedia Devices", Section 4.16 entitled "Recording for DVD-R media"). To provide compatibility with conventional CD-R and DVD-R, it is reported in response to these commands that a TRACK is present in each of a plurality of recorded areas.

Specifically, in the case of the state shown in portions (h) of FIGS. 5 and 6, it is reported that SESSION#1 has TRACK#1 and TRACK#2 and SESSION#2 has TRACK#3 and TRACK#4.

In the case of the state shown in portions (l) of FIGS. 5 and 6, it is reported that SESSION#1 has TRACK#1 and TRACK#2, SESSION#2 has TRACK#3 and TRACK#4, and SESSION#3 has TRACK#5.

By managing the transitions shown in FIGS. 3, 4, 5 and 6, the end user can record user data using a writing software called CD Burning (for example, an application corresponding to Disc-At-Once, Track-At-Once, and Session-At-Once recording operations).

In this embodiment of the present invention, 0-padding data is recorded into an unrecorded area of a recording area in response to a CLOSE TRACK/SESSION command for a designated TRACK. The 0-padding data may be any data. In addition, for example, management information may be caused to indicate that any data is recorded in an unrecorded area of a recording area, while, in fact, no data is recorded in an unrecorded area of a recording area.

The order of the session start flag 12, the start position 13, and the last recorded position 14 arranged in the recording area entry 11 is not limited to this order.

As long as it can be determined whether or not a predetermined recording area is located at the beginning of a session, the last recorded position of a recording area can be referenced instead of the start position 13 of a recording area in order to recognize the beginning of a session. The size of a recording area may be referenced instead of the start position or the last recorded position of a recording area.

The management information header 9 may contain, for example, the number of recording area entries registered in the entry number array 10 (i.e., the total number of incrementally writable recording areas), the number of entries registered in the recording area entry 11 (i.e., the total number of recording areas), or the number of session start flags 12 having a value of "1" (i.e., the total number of sessions).

Thus, according to the write-once recording medium of the present invention, one session is comprised of at least one of the at least one recording area, and management information contains identification information for identifying a recording area located at a boundary of a session. Therefore, a boundary of a session can be identified based on only a recording area located at the beginning of a session. As a result, the size of information for identifying a boundary of a session can be reduced.

In addition, according to the write-once recording medium of the present invention, management information can contain information indicating a recording area located at the beginning of a session, thereby making it possible to reduce the size of the management information. Therefore, if the size of an area for incrementally writing management information is the same, the number of times with which the user can incrementally write management information can be increased. If the number of times with which the user can incrementally write management information is the same, the size of an area for incrementally writing management information can be reduced. As a result, a capacity for recording user data can be increased.

The write-once recording medium according to the embodiment of the present invention has heretofore been described with reference to FIGS. 2 to 6.

For example, in the embodiment of FIGS. 2 to 6, the management information area 7 corresponds to a "management information area for recording management information for managing a recorded state". The data area 5 corresponds to a "user data area for recording user data, which is configured to contain at least one recording area". Each of the sessions #1 to #3 corresponds to a "session which is comprised of at least one of the at least one recording area". The session start flag 12 corresponds to "identification information for identifying a recording area located at a boundary of a session". Information indicating the start position 13 of a recording area and information indicating the last recorded position 14 of a recording area corresponds to "range information indicating a recording range of at least one recording area".

However, the write-once recording medium of the present invention is not limited to the embodiment of FIG. 2 to 6. As long as the write-once recording medium has the above-described "management information area for recording management information for managing a recorded state", "user data area for recording user data, which is configured to contain at least one recording area", and "session which is comprised of at least one of the at least one recording area", and information to be recorded onto the write-once recording medium is the above-described "identification information for identifying a recording area located at a boundary of a session" and "range information indicating a recording range of at least one recording area", the write-once recording medium can have any structure.

Figure 7:
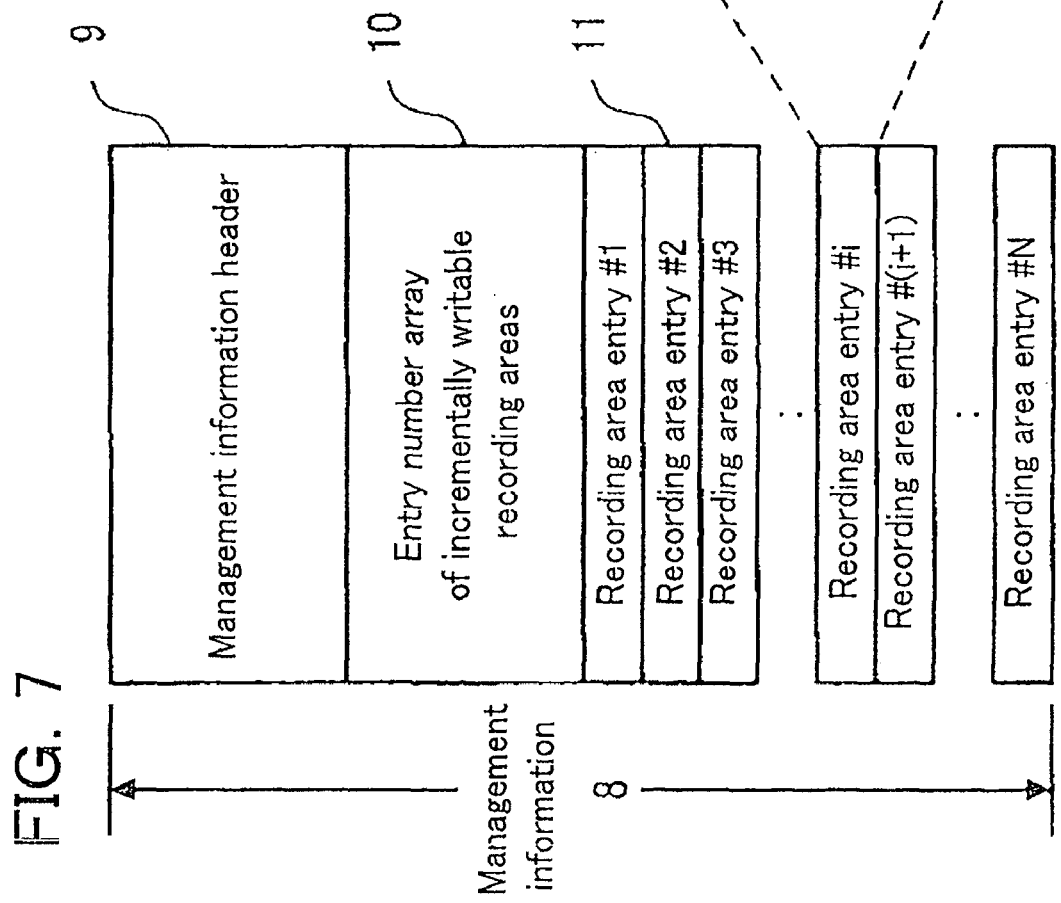
FIG. 7 is a diagram showing another exemplary data structure of the management information 8 according to an embodiment of the present invention.

Identification information may be, for example, a session toggle flag (see FIG. 7). Alternatively, identification information may be an entry number array of a recording area at the beginning of a session (see FIG. 9).

FIG. 7 shows another exemplary data structure of the management information 8 according to an embodiment of the present invention. In FIG. 7, information which is the same as information contained in the management information 8 of FIG. 2 is indicated by the same reference numeral, and its description is omitted.

A difference between the management information 8 of FIG. 2 and the management information 8 of FIG. 7, is that the session start flag 12 contained in the management information 8 of FIG. 2 is replaced with the session toggle flag 15 contained in the management information 8 of FIG. 7. The session toggle flag 15 is provided to at least one recording area, which has any one of a value of "0" and a value of "1". The value of the session toggle flag 15 provided to a recording area contained in a session is inverse to the value of the session toggle flag 15 provided to a recording area contained in a session adjacent to that session.

FIG. 8 shows a transition of the contents of the entry number array 10 and the recording area entry 11. Portions (I) of FIGS. 5 and 8 show a concurrent state.

Portions (I) of FIGS. 5 and 8 show a state of the data area 5 after a CLOSE TRACK/SESSION command for a designated SESSION (the session #2 is designated) has been received from a higher-level control apparatus.

A closed recording area #1 and a closed recording area #2 belong to a session #1. A closed recording area #3 and a closed recording area #4 belong to the session #2. A recording area #5 in which no information has been recorded belongs to a session #3 The recording area #5 is the only incrementally writable recording area.

In the recording area entry #1 and the recording area entry #2, the session toggle flag 15 is set to have a value of "1". In the recording area entry #3 and the recording area entry #4, the session toggle flag 15 is set to have a value of "0" In the recording area entry #5, the session toggle flag 15 is set to have a value of "1".

The initial value of the session toggle flag 15 is not limited to a value of "1" When the initial value of the session toggle flag 15 is set to be a value of "0", the session toggle flag 15 is set to have a value of "0" in the recording area entry #1 and the recording area entry #2, the session toggle flag 15 is set to have a value of "1" in the recording area entry #3 and the recording area entry #4, and the session toggle flag 15 is set to have a value of "0" in the recording area entry #5.

Thus, according to the above-described exemplary write-once recording medium of the present invention, by containing, in the management information, information indicating a recording area located at the beginning of a session, the quantity of management information can be reduced. Therefore, if the size of an area for incrementally writing management information is the same, the number of times with which the user can incrementally write management information can be increased. If the number of times with which the user can incrementally write management information is the same, the size of an area for incrementally writing management information can be reduced. As a result, a capacity for recording user data can be increased.

Figure 9:
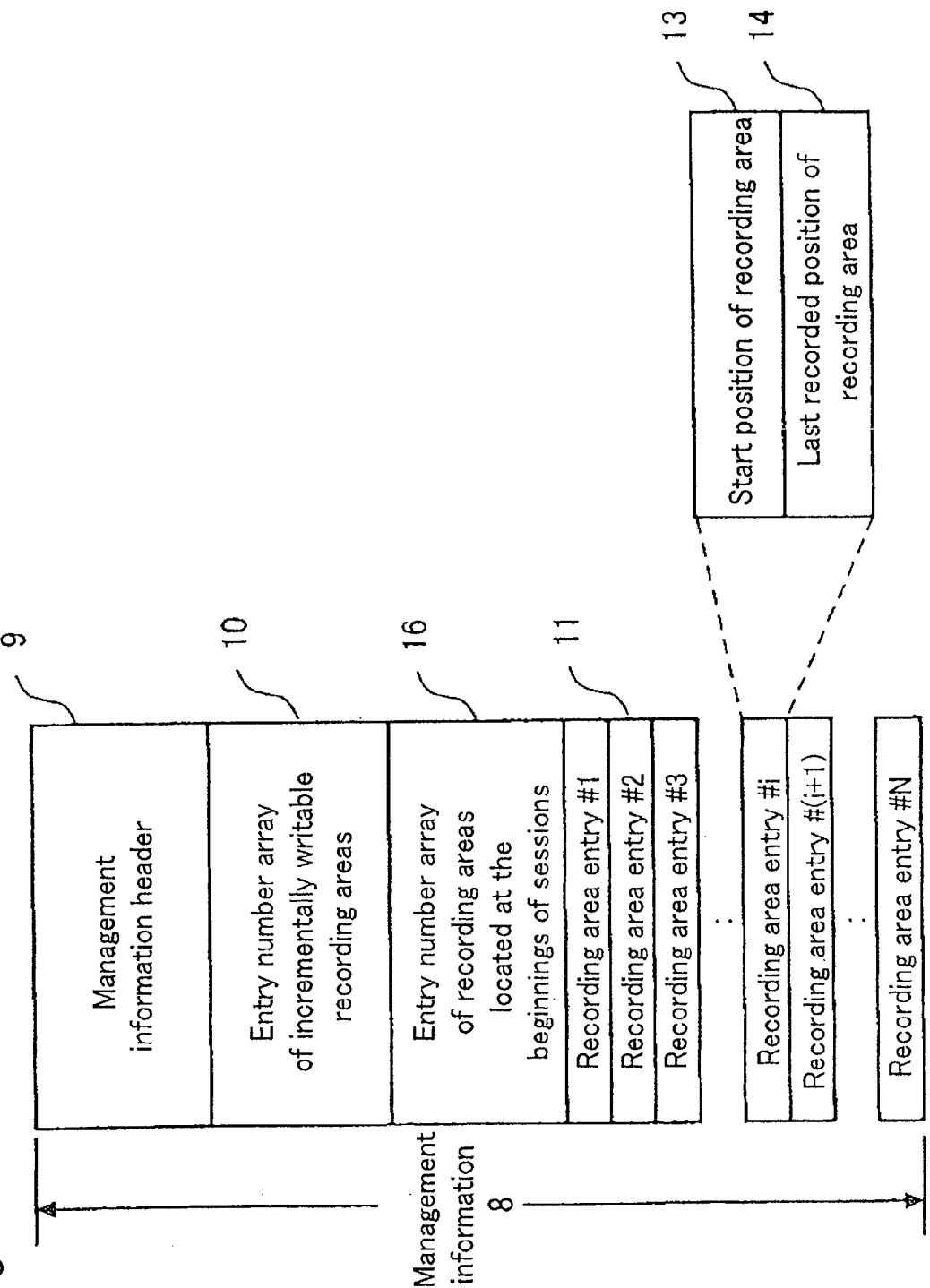
FIG. 9 is a diagram showing still another exemplary data structure of the management information 8 according to an embodiment of the present invention.

FIG. 9 shows still another exemplary data structure of the management information 8 according to an embodiment of the present invention. In FIG. 9, information which is the same as information contained in the management information 8 of FIG. 2 is indicated by the same reference numeral, and its description is omitted.

A difference between the management information 8 of FIG. 2 and the management information 8 of FIG. 9, is that the session start flag 12 contained in the management information 8 of FIG. 2 is replaced with an entry number array 16 of a recording area at the beginning of a session contained in the management information 8 of FIG. 9. The entry number array 16 is comprised of entry numbers of recording areas located at the beginnings of sessions. For example, in the entry number array 16, the first number is an entry number (i.e., a number "1") of a recording area #1 located at the beginning of a session #1, the second number is an entry number (i.e., a number "3") of a recording area #3 located at the beginning of a session #2, . . . . The entry numbers are listed in the ascending order. Thus, in the entry number array 16, the entry number of a recording area located at the beginning of each session is stored. When a session is not present, a number "0" is stored.

FIG. 10 shows a transition of the contents of the entry number array 10 and the recording area entry 11. Portions (I) of FIGS. 5 and 10 show a concurrent state.

Portions (I) of FIGS. 5 and 10 show a state of the data area 5 after a CLOSE TRACK/SESSION command for a designated SESSION (the session #2 is designated) has been received from a higher-level control apparatus.

A closed recording area #1 and a closed recording area #2 belong to a session #1. A closed recording area #3 and a closed recording area #4 belong to the session #2. A recording area #5 in which no information has been recorded belongs to a session #3. The recording area #5 is the only incrementally writable recording area.

Therefore, the entry number array. 16 contains the entry number "1" of the recording area #1, the entry number "3" of the recording area #3, and the entry number "5" of the recording area #5, and the number "0".

Thus, according to the above-described exemplary write-once recording medium of the present invention, by containing, in the management information, information indicating a recording area located at the beginning of a session, the quantity of management information can be reduced. Therefore, if the size of an area for incrementally writing management information is the same, the number of times with which the user can incrementally write management information can be increased. If the number of times with which the user can incrementally write management information is the same, the size of an area for incrementally writing management information can be reduced. As a result, a capacity for recording user data can be increased.

For example, conventionally, 4 bytes are required to indicate a boundary of a session. In the above-described exemplary write-once recording medium of the present invention, only 1 or 2 bytes are required to indicate a boundary of a session.

According to the write-once recording medium of the present invention of FIGS. 9 and 10, it is simple to calculate the total number of sessions, so that a session number to which each recording area belongs can be quickly calculated, as compared to the write-once recording medium of the present invention of FIGS. 3 to 6. As a result, a READ DISC INFORMATION command and a READ TRACK INFORMATION command (for example, SFF 8090i standard, "Mt. Fuji Command for Multimedia Devices", Section 4.16 entitled "Recording for DVD-R media) can be processed with high speed.

2-1. Recording Apparatus

Hereinafter, a recording apparatus according to an embodiment of the present invention will be described with reference to the accompanying drawings.

Figure 11:
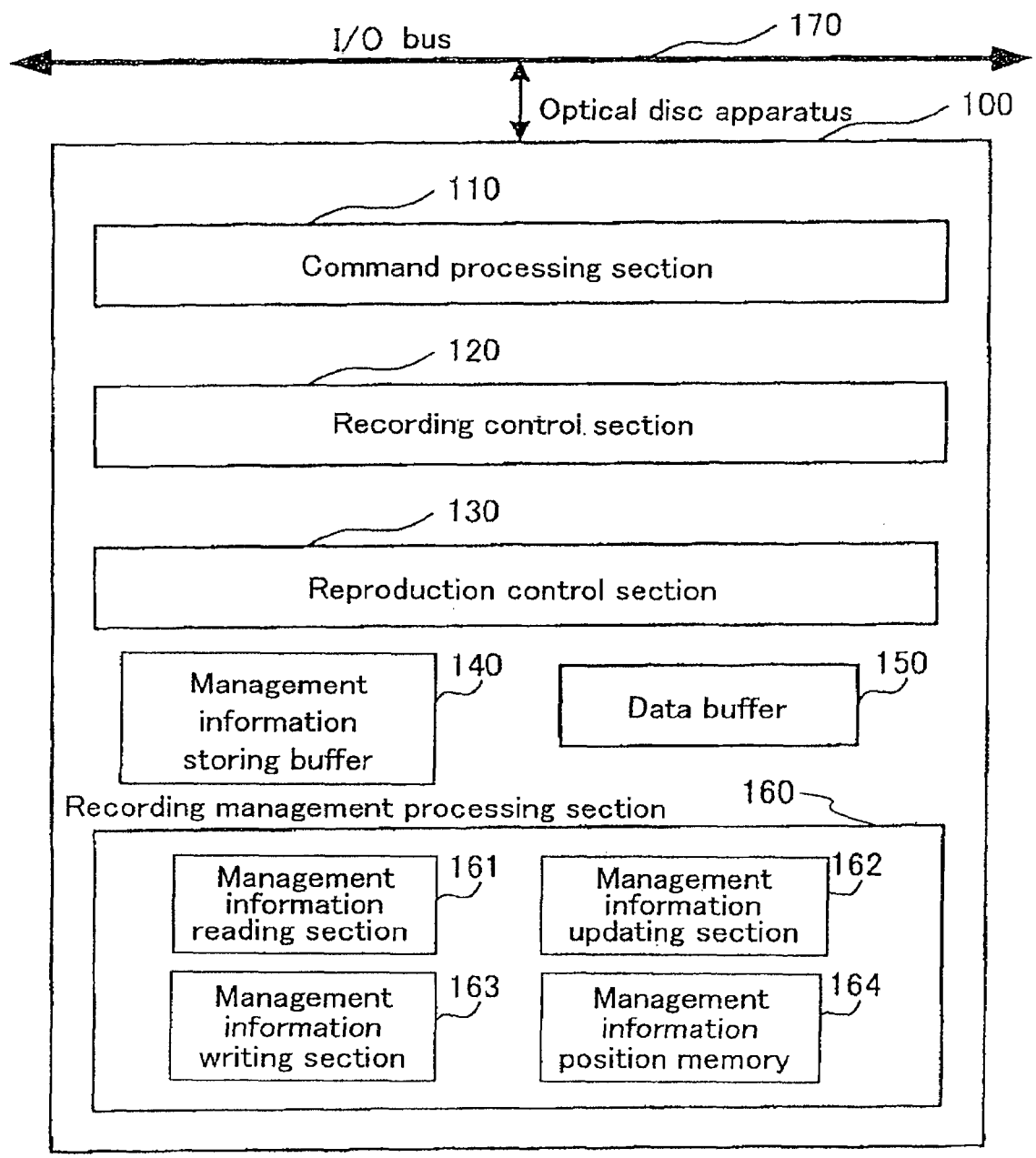
FIG. 11 is a diagram showing an exemplary structure of an optical disc apparatus 100 according to an embodiment of the present invention.

FIG. 11 shows an exemplary structure of an optical disc apparatus 100 according to an embodiment of the present invention.

The optical disc apparatus 100 serves as a recording apparatus according to an embodiment of the present invention, when recording information.

The optical disc apparatus 100 is connected to an I/O bus 170. The I/O bus 170 is connected to a higher-level control apparatus (not shown). The higher-level control apparatus is typically a host computer.

The optical disc apparatus 100 is configured to load an optical disc 1 thereinto. The optical disc apparatus 100 comprises a command processing section 110 for processing a command from a higher-level control apparatus, a recording control section 120 for controlling recording of the optical disc 1, a reproduction control section 130 for controlling reproduction of the optical disc 1, a management information storing buffer 140 for storing management information 8 (FIG. 1), a data buffer 150 for temporarily storing recording data, and a recording management processing section 160 for processing management information 8.

The recording management processing section 160 comprises a management information reading section 161, a management information writing section 163 for writing management information 8, stored in the management information storing buffer 140, into a management information area 7 (FIG. 1), a management information updating section 162 for updating management information 8, stored in the management information storing buffer 140, in accordance with a command from a higher-level control apparatus, and a management information position memory 164 for storing the position of the latest management information 8.

The management information reading section 161 searches for management information 8 which was last recorded in the pieces of management information 8 recorded in the management information area 7. The management information 8 last recorded in the management information area 7 is read out into the management information storing buffer 140.

2-2. Recording Method

Hereinafter, a recording method according to an embodiment of the present invention will be described with reference to the accompanying drawings.

Figure 12:
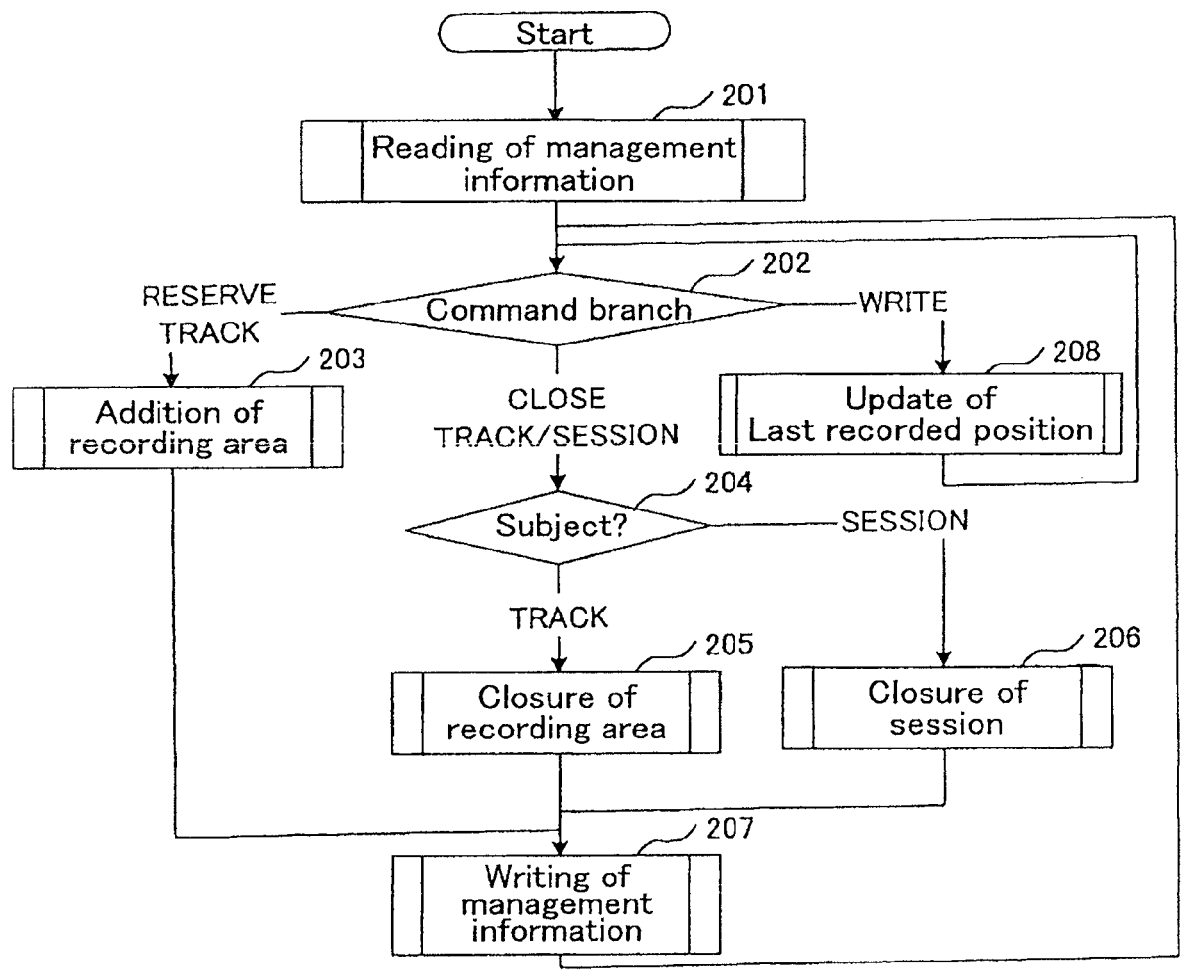
FIG. 12 is a flowchart showing a recording procedure according to an embodiment of the present invention.

FIG. 12 shows a recording procedure according to an embodiment of the present invention.

The recording procedure is performed by the recording management processing section 160. The recording management processing section 160 performs steps 201 to 208. The management information reading section 161 performs reading of management information (step 201). The management information writing section 163 performs writing of management information (step 207). The management information updating section 162 performs the remainder of the recording procedure (steps 202 to 206 and step 208).

Hereinafter, the recording procedure of the embodiment of the present invention will be described with reference to FIGS. 11 and 12 step by step. Hereinafter, for example, a procedure for recording management information 8 containing a session start flag and the like onto a write-once recording medium will be described.

Step 201: when the optical disc 1 is loaded in the optical disc apparatus 100, the management information reading section 161 reads the latest management information 8, and stores the read latest management information 8 into the management information storing buffer 140.

Note that when the latest management information 8 is read out in step 201, it may be determined whether or not the number of recording areas is less than a predetermined value of M, where M is an integer of 2 or more.

Step 202: the optical disc apparatus 100 is ready to receive commands relating to the optical disc 1 from a higher-level control apparatus until the optical disc 1 is ejected or the power source is turned off.

When a RESERVE TRACK command is issued to the optical disc 1, the process goes to step 203. When a CLOSE TRACK/SESSION command is issued to the optical disc 1, the process goes to step 204. When a WRITE command is issued to the optical disc 1, the process goes to step 208.

The RESERVE TRACK command is a command from a higher-level control apparatus, which requests reservation of a recording area. The CLOSE TRACK/SESSION command is a command from a higher-level control apparatus, which requests closure of a recording area. The WRITE command is a command from a higher-level control apparatus, which requests recording of data.

Step 203: when the RESERVE TRACK command is received, management information 8 stored in the management information storing buffer 140 is generated (or changed) so as to add a recording area.

For example, referring to portions (h) of FIGS. 5 and 6, management information 8 is generated (or changed) to indicate that the recording area #3 from the position P5 to the end of the data area 5 is divided into a recording area #3 from the position P5 to a position P6 and a recording area #4 from the position P6 to the end of the data area 5. In the entry number array 10, a number "4" indicating that the recording area #4 is incrementally writable, is registered to indicate that the recording area #4 has been added. In the recording area entry #4, the session start flag 12 of the recording area #4 is set to have a value of "0", while the start position 13 of the recording area #4 is set to be the position P6.

After generation (or change), the process goes to step 207.

Step 204: when the CLOSE TRACK/SESSION command is received, it is determined whether a subject to be closed is a TRACK or a SESSION. When it is determined that the subject to be closed is a TRACK, the process goes to step 205. When it is determined that the subject to be closed is a SESSION, the process goes to step 206.

Step 205: management information 8 stored in the management information storing buffer 140 is generated (or changed) to close a recording area (TRACK).

For example, referring to portions (j) of FIGS. 5 and 6, 0-padding data is recorded into an unrecorded area of the recording area #3 (an area from the position P7 to the position P6), and the recording area #3 becomes closed. In order to indicate that the recording area #3 is not incrementally writable, the number "3" is removed from the entry number array 10.

After generation (or change), the process goes to step 207.

Step 206: management information 8 stored in the management information storing buffer 140 is generated (or changed) so as to close a recording area belonging to an outermost session.

For example, referring to portions (l) of FIGS. 5 and 6, the closed recording area #3 and the closed recording area #4 belong to the session #2, while the recording area #5 having no recorded information belongs to the session #3. In the recording area entry #5, the session start flag 12 is set to be a value of "1".

After generation (or change), the process goes to step 207.

Step 207: when the management information 8 stored in the management information storing buffer 140 is updated, the latest management information 8 is incrementally written into an incrementally writable area in the management information area 7.

Step 208: when the WRITE command is received, it is determined what incrementally writable position matches a designated recording start position, and transferred data is recorded onto the optical disc 1. The incrementally writable position can be obtained based on the last recorded position 14 of the recording area entry 11 registered in the entry number array 10. The value of the last recorded position 14 of the management information 8 stored in the management information storing buffer 140 is generated (or changed) based on the recorded position.

For example, referring to portions (i) of FIGS. 5 and 6, by recording data into the recording area #3, the last recorded position 14 of the recording area #3 is changed into a position (P7−1). By recording data into the recording area #4, the last recorded position 14 of the recording area #4 is changed into a position (P8−1).

Generally, when a position is indicated by a sector number, a value indicating an incrementally writable position is obtained by adding 1 to a value indicating the last recorded position 14. Note that when the last recorded position 14 is not registered (value: 0), a value indicating an incrementally writable position is the same as a value indicating the start position 13 of a recording area.

When an ECC (error correction code) is comprised of 16 sectors as in DVD, an actual incrementally writable position is a multiple of 16. Therefore, although the four fundamental operations of arithmetic are required to some extent to obtain an incrementally writable position, an incrementally writable position can be obtained based on the last recorded position 14 or the start position 13.

Figure 13:
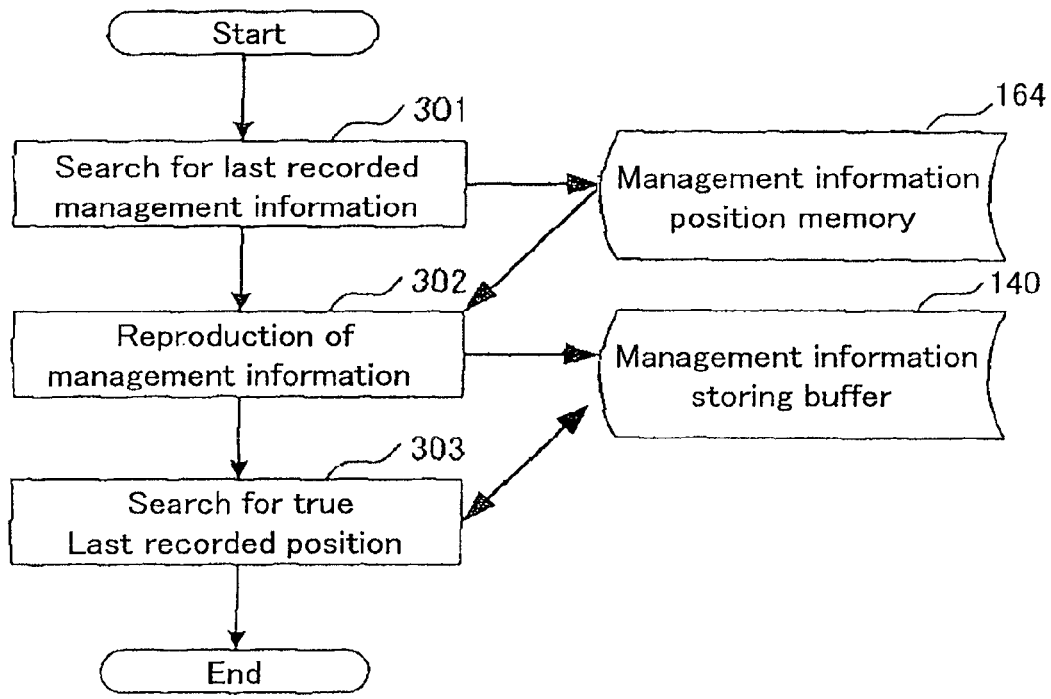
FIG. 13 is a flowchart showing details of a procedure for reading management information.

FIG. 13 shows a procedure for reading management information.

Hereinafter, a procedure for reading management information will be described step by step in detail with reference to FIGS. 11 and 13 (for step 201, see FIG. 12).

Step 301: the reproduction control section 130 searches for the position of last recorded management information 8 in the management information area 7. Position information indicating the position is stored in the management information position memory 164.

Step 302: the reproduction control section 130 references the positional information stored in the management information position memory 164, reproduces the management information 8, and stores the reproduced management information 8 into the management information storing buffer 140. When no management information 8 has been recorded in the management information area 7 (for example, a brand-new optical disc 1 is loaded in the optical disc apparatus 100), the management information 8 is initialized (portion (a) of FIG. 4).

Step 303: the reproduction control section 130 searches for the end of a recorded area from the last recorded position 14 as a starting point, obtains an actual last recorded position 14, and updates management information 8 stored in the management information storing buffer 140 based on information indicating the actual last recorded position 14. Thereafter, the process is ended.

The last recorded position 14 of each recording area reproduced from the management information 8 may be different from the actual last recorded position, i.e., includes error to some extent. This is because when the last recorded position 14 of management information 8 is updated every time the WRITE command is received, a very large number of management information areas 7 are required. For this reason, it is assumed that management information 8 is incrementally written into the management information area 7 only when a recording area is added or closed (FIG. 12). Therefore, the reproduction control section 130 obtains an actual last recorded position 14 by searching for the end of a recorded area using the last recorded position 14 as a starting point.

Step 303 may be omitted if the latest contents of the management information storing buffer 140 can be guaranteed to be incorporated into management information 8 of a management information area 7 when the optical disc 1 is ejected, or the optical disc apparatus 100 is turned off, assuming that the optical disc apparatus 100 has a back-up power source.

Figure 14:
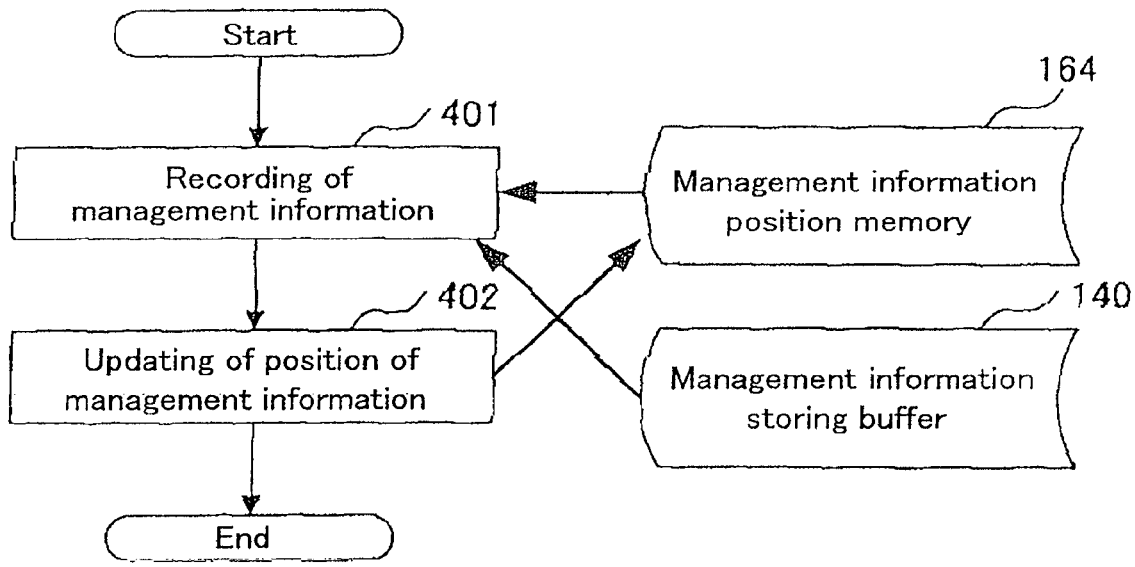
FIG. 14 is a flowchart showing details of a procedure for writing management information.

FIG. 14 shows details of a procedure for writing management information.

Hereinafter, a procedure for writing management information will be described in detail with reference to FIGS. 11 and 14 (for step 207, see FIG. 12).

Step 401: the recording control section 120 references positional information stored in the management information position memory 164 to incrementally write the management information 8 stored in the information storing buffer 140 to the management information area 7.

Step 402: based on the incrementally written area, positional information stored in the management information position memory 164 is changed to information indicating the incrementally writable position of the management information area 7. Thereafter, the process is ended.

Figure 15:
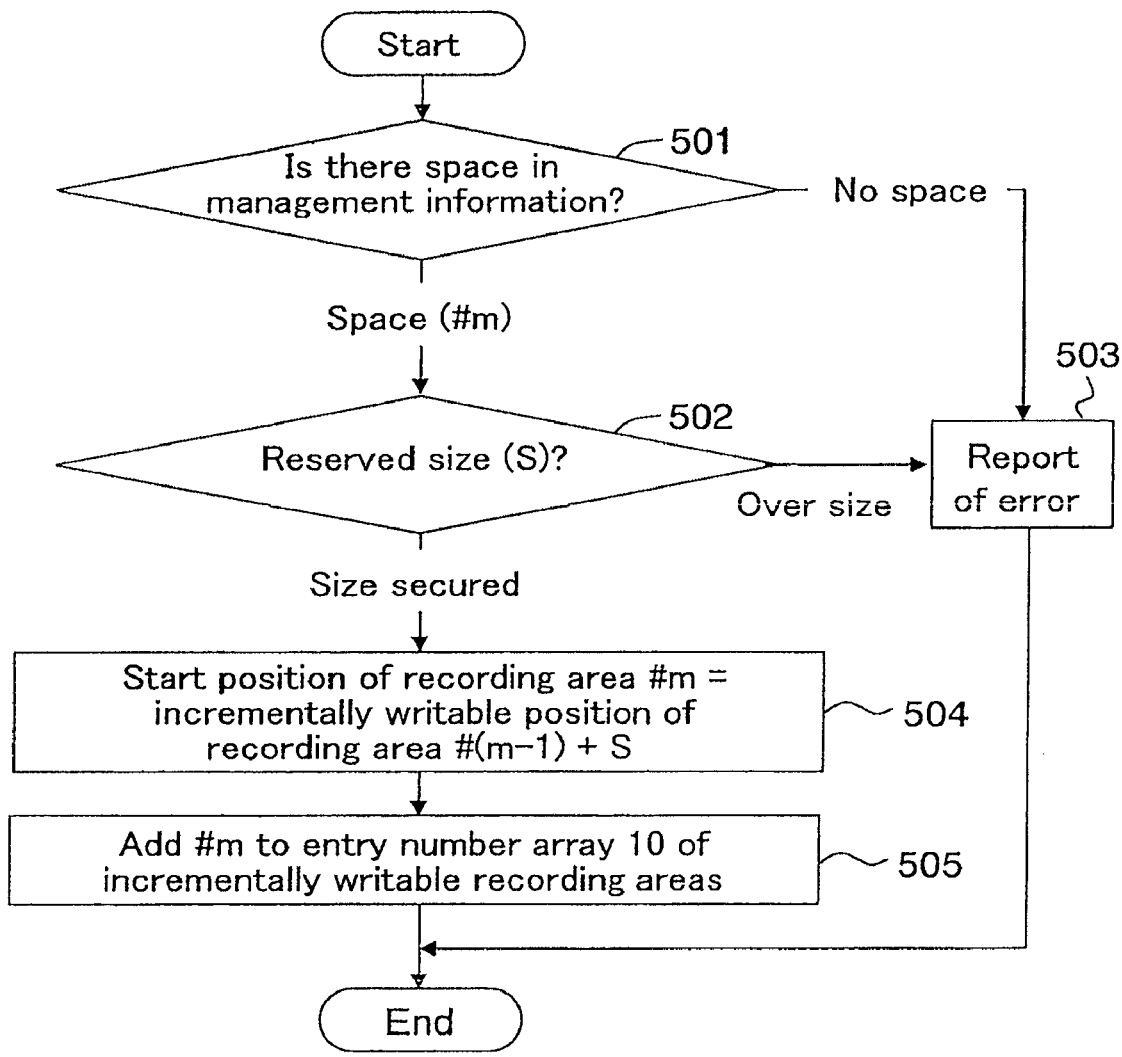
FIG. 15 is a flowchart showing details of a procedure for adding a recording area.

FIG. 15 shows a procedure for adding a recording area in detail.

Hereinafter, a procedure for adding a recording area will be described step by step in detail with reference to FIGS. 11 and 15 (for step 203, see FIG. 12).

Step 501: it is determined whether or not there is a space in the entry number array 10 and the recording area entry 11 (i.e., whether or not there is a field having a value of "0" in the fields of the entry number array 10 and the fields of the recording area entry 11, or whether or not the number of fields already used of the fields of the entry number array 10 and the fields of the recording area entry 11 is less than the maximum number).

When it is determined that there is a space, the process goes to step 502, in which the entry number array 10 having a space or an entry number #m corresponding to a recording area in the recording area entry 11 is used. When it is determined that there is not a space, the process goes to step 503.

Step 502: it is determined whether or not an area having a size equal to or greater than a size (S) requested by a higher-level control apparatus area can be secured (i.e., the size of an area from an incrementally writable position to the end of the data area 5 is greater than S). Note that an incrementally writable position can be obtained based on the start position 13 and the last recorded position 14 of a recording area #(m−1).

When it is determined that a sufficient area can be secured, the process goes to step 504. When it is not determined that a sufficient area can be secured, the process goes to step 503.

Step 503: information indicating the contents of an error is sent to the higher-level control apparatus, and the process is ended.

Step 504: a value obtained by adding the size S to the incrementally writable position of the recording area #(m−1) is set to be the start position 13 of the recording area entry #m, and the process goes to step 505.

For example, when no recording area #(m−1) has been recorded (the last recorded position 14 is 0), a value obtained by adding the size S to the start position 13 of the recording area #(m−1) is set to be the start position 13 of the recording area #m.

Step 505: the value m is added to the entry number array 10, and the process is ended.

Figure 16:
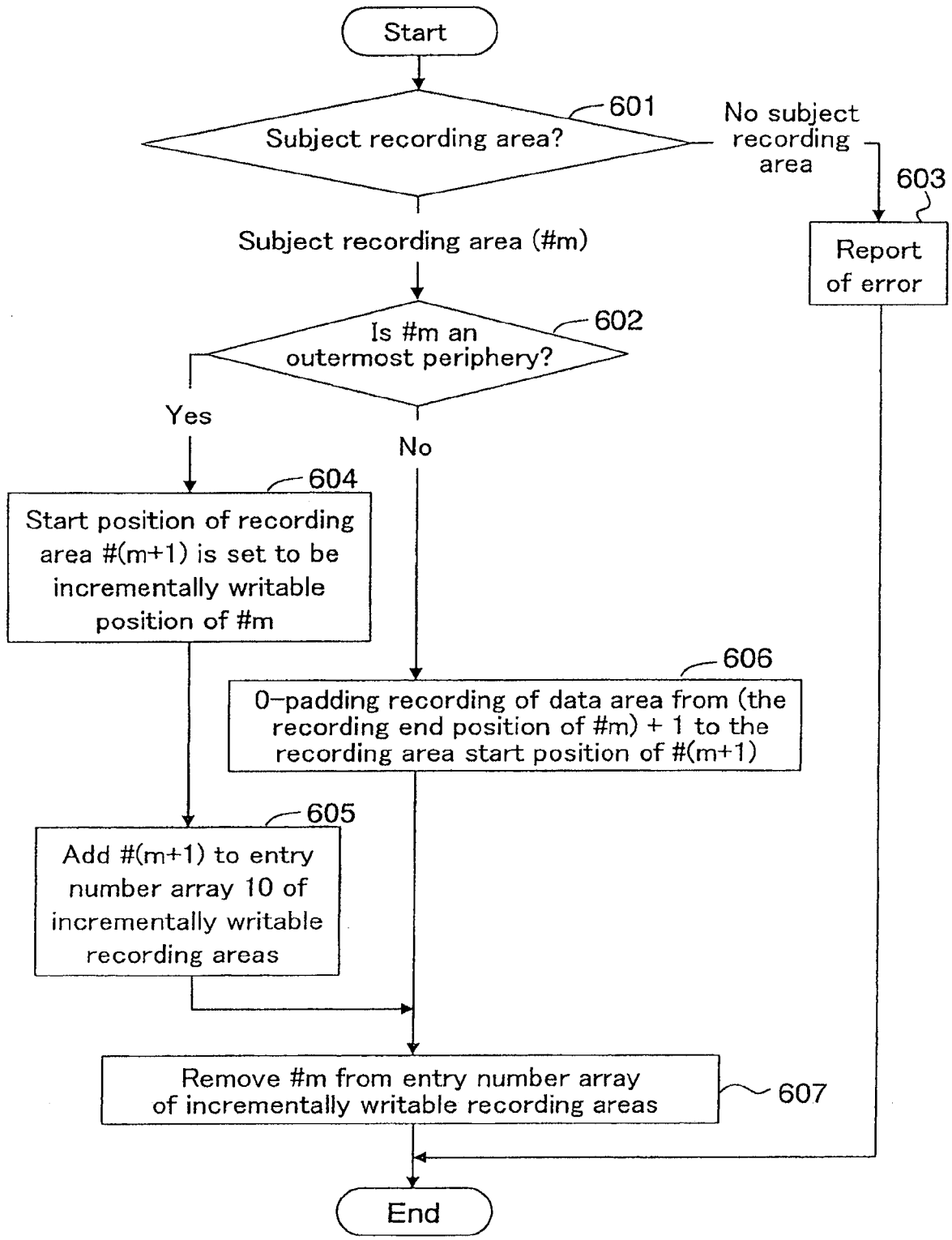
FIG. 16 is a flowchart showing details of a procedure for closing a recording area.

FIG. 16 shows a procedure for closing a recording area.

Hereinafter, a procedure for closing a recording area will be described step by step in detail with reference to FIGS. 11 and 16 (for step 205, see FIG. 12).

Step 601: it is determined whether or not a recording area entry number (TRACK number) designated by a higher-level control apparatus corresponds to a recording area entry number contained in the entry number array 10.

When the determination is affirmative, the process goes to step 602, in which the entry number #m of the recording area is used. When the determination is not affirmative, the process goes to step 603.

Step 602: it is determined whether or not the recording area #m is an outermost recording area. For example, when the start position 13 of the recording area entry #(m+1) is 0, it can be determined that the recording area #m is an outermost recording area.

When it is determined that the recording area #m is an outermost recording area (Yes), the process goes to step 604. When it is determined that the recording area #m is not an outermost recording area (No), the process goes to the step 606.

Step 603: information indicating the contents of error is sent to the higher-level control apparatus, and the process is ended.

Step 604: the start position 13 of the recording area entry #(m+1) is set to be an incrementally writable position, and the process goes to step 605. The incrementally writable position is obtained from the start position 13 and the last recorded position 14 of the recording area entry #m (portions (k) of FIGS. 5 and 6).

Step 605: the value (m+1) is added to the entry number array 10, and the process goes to step 607.

Step 606: 0-padding data is recorded into an area from the incrementally writable position to the start position 13 of the recording area entry #(m+1), and the process goes to step 607.

Note that in this step, recording data may not be necessarily 0-padding data. This step itself may be omitted.

Step 607: the value m is changed to a value of 0 in the entry number array 10.

Figure 17:
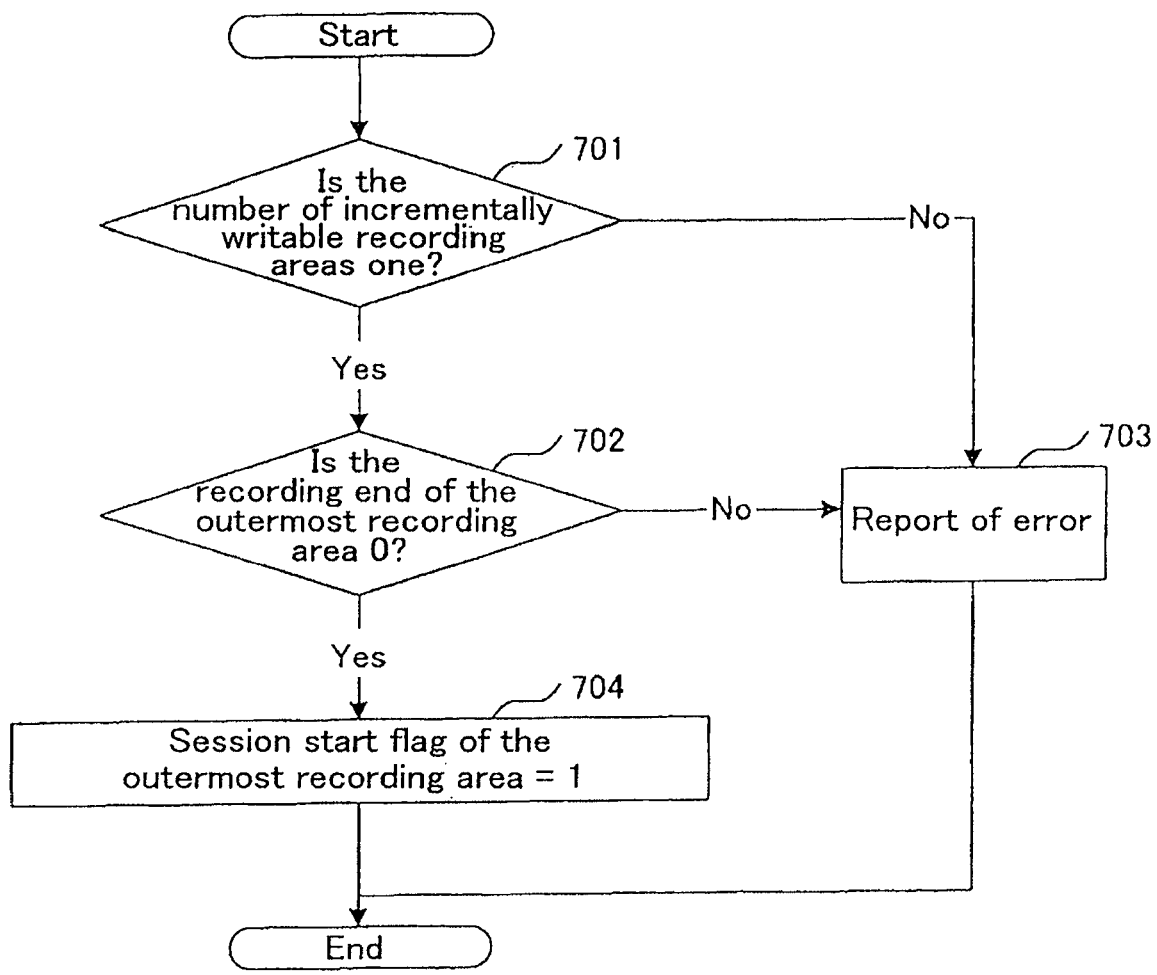
FIG. 17 is a flowchart showing details of a procedure for closing a session.

FIG. 17 shows details of a procedure for closing a session.

Hereinafter, a procedure for closing a session will be described step by step in detail with reference to FIGS. 11 and 17 (for step 206, see FIG. 12).

Step 701: it is determined whether or not only a single value indicating an outermost recording area is registered in the entry number array 10.

When the determination is affirmative (Yes), the process goes to step 702. When the determination is not affirmative (No), the process goes to step 703.

Generally, in a write-once recording medium, such as CD-R or DVD-R, TRACK needs to have been closed in order to close SESSION. For example, the condition is satisfied when all recording areas excluding an outermost recording area which is an unrecorded area are in the non-incrementally writable state (see portion (f) of FIG. 4 and portion (k) of FIG. 6). In step 701, it is determined whether or not the above-described condition is satisfied.

Step 702: it is determined whether or not the last recorded position 14 of an outermost recording area entry has a value of "0".

When the determination is affirmative (Yes), the process goes to step 704. When the determination is not affirmative (No), the process goes to step 703.

Step 703: information indicating the contents of error is sent to the higher-level control apparatus, and the process is ended.

Step 704: the value of the session start flag 12 given to an outermost recording area entry is set to be a value of "1", and the process is ended.

Note that step 702 of the session closing procedure (steps 701 to 704) is an example in which when a boundary of a session is newly added, it is determined whether or not a recording area containing a sector having a maximum sector number of at least one recording area has already been recorded.

According to the recording method and the recording apparatus of the present invention, it is possible to record management information onto the write-once recording medium of the present invention. Since management information can be recorded onto the write-once recording medium having only a small size of area for recording management information, the time required for searching for the latest management information can be reduced. As a result, the time required from when the user loads the write-once recording medium into an apparatus to when a user data area of the write-once recording medium is ready to access, can be reduced.

A recording method according to an embodiment of the present invention has heretofore been described with reference to FIGS. 12 to 17.

For example, in the embodiment of FIG. 12, step 203, step 205, step 206 and step 208 correspond to the "step of generating management information containing range information indicating a recording range of at least one recording area and identification information for identifying a recording area located at a boundary of a session" and step 207 corresponds to the "step of recording the resultant management information into a management information area".

However, the recording method of the present invention is not limited to the embodiment of FIG. 12. The recording method of the present invention may be achieved by any arbitrary procedure as long as the procedure has functions of the "step of generating management information containing range information indicating a recording range of at least one recording area and identification information for identifying a recording area located at a boundary of a session" and the "step of recording the resultant management information into a management information area".

For example, when management information 8 containing a session toggle flag is recorded onto a write-once recording medium (FIGS. 7 and 8), the step of causing the session toggle flag 15 of a recording area immediately before the recording area #m (i.e., a recording area #(m−1)) to have the same value as that of the session toggle flag 15 is performed in conjunction with the step of adding a recording area (step 504 in FIG. 15). In addition, the step of inverting the session toggle flag 15 of the recording area #m with respect to that of the recording area #(m−1) is performed instead of the step of closing a session (step 704 in FIG. 17).

For example, when management information 8 containing an entry number array of a recording area at the beginning of a session is recorded onto a write-once recording medium (FIGS. 9 and 10), the step of registering the entry number of an outermost recording area into the entry number array 16 is performed instead of the step of closing a session (step 704 in FIG. 17).

3-1. Reproduction Apparatus

Hereinafter, a reproduction apparatus according to an embodiment of the present invention will be described with reference to the accompanying drawings.

Figure 18:
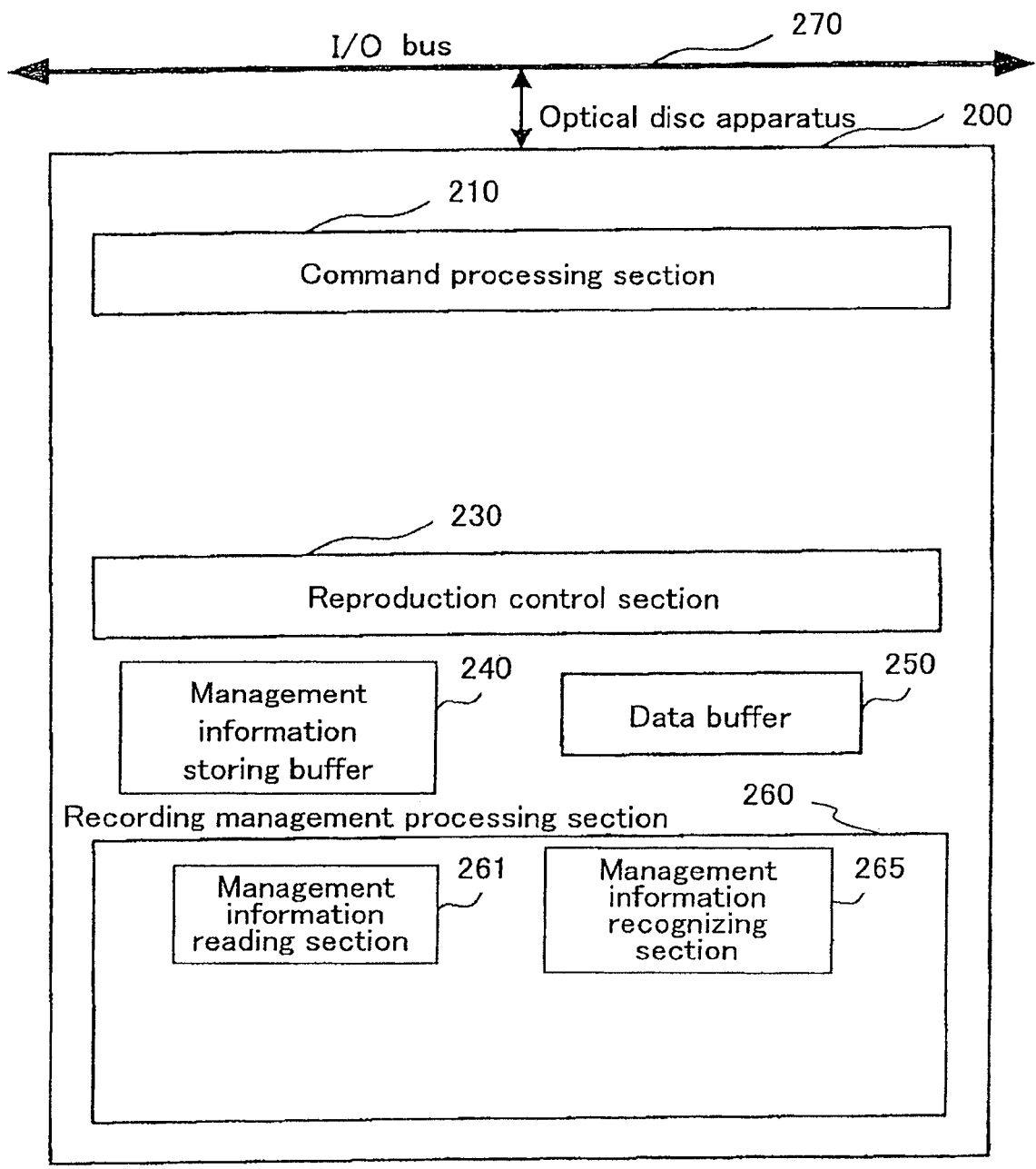
FIG. 18 is a diagram showing an exemplary structure of an optical disc apparatus 200 according to an embodiment of the present invention.

FIG. 18 shows an exemplary structure of an optical disc apparatus 200 according to an embodiment of the present invention.

The optical disc apparatus 200 serves as a reproduction apparatus according to an embodiment of the present invention, when reproducing information.

The optical disc apparatus 200 is connected to an I/O bus 270. The I/O bus 270 is connected to a higher-level control apparatus (not shown). The higher-level control apparatus is typically a host computer.

The optical disc apparatus 200 is configured to load an optical disc 1 thereinto. The optical disc apparatus 200 comprises a command processing section 210 for processing a command from a higher-level control apparatus, a reproduction control section 230 for controlling reproduction of the optical disc 1, a management information storing buffer 240 for storing management information 8 (FIG. 1), a data buffer 250 for temporarily storing reproduced data, and a recording management processing section 260 for processing management information 8.

The recording management processing section 260 comprises a management information reading section 261 and a management information recognizing section 265.

The management information reading section 261 searches for last recorded management information 8 among at least one piece of management information 8 recorded in a management information area 7, and outputs the management information 8 last recorded in the management information area 7 into a management information storing buffer 240.

The management information recognizing section 265 generates data based the contents of the management information storing buffer 240 in response to a command from a higher-level control apparatus and outputs the data to the higher-level control apparatus.

3-2. Reproduction Method

Figure 19:
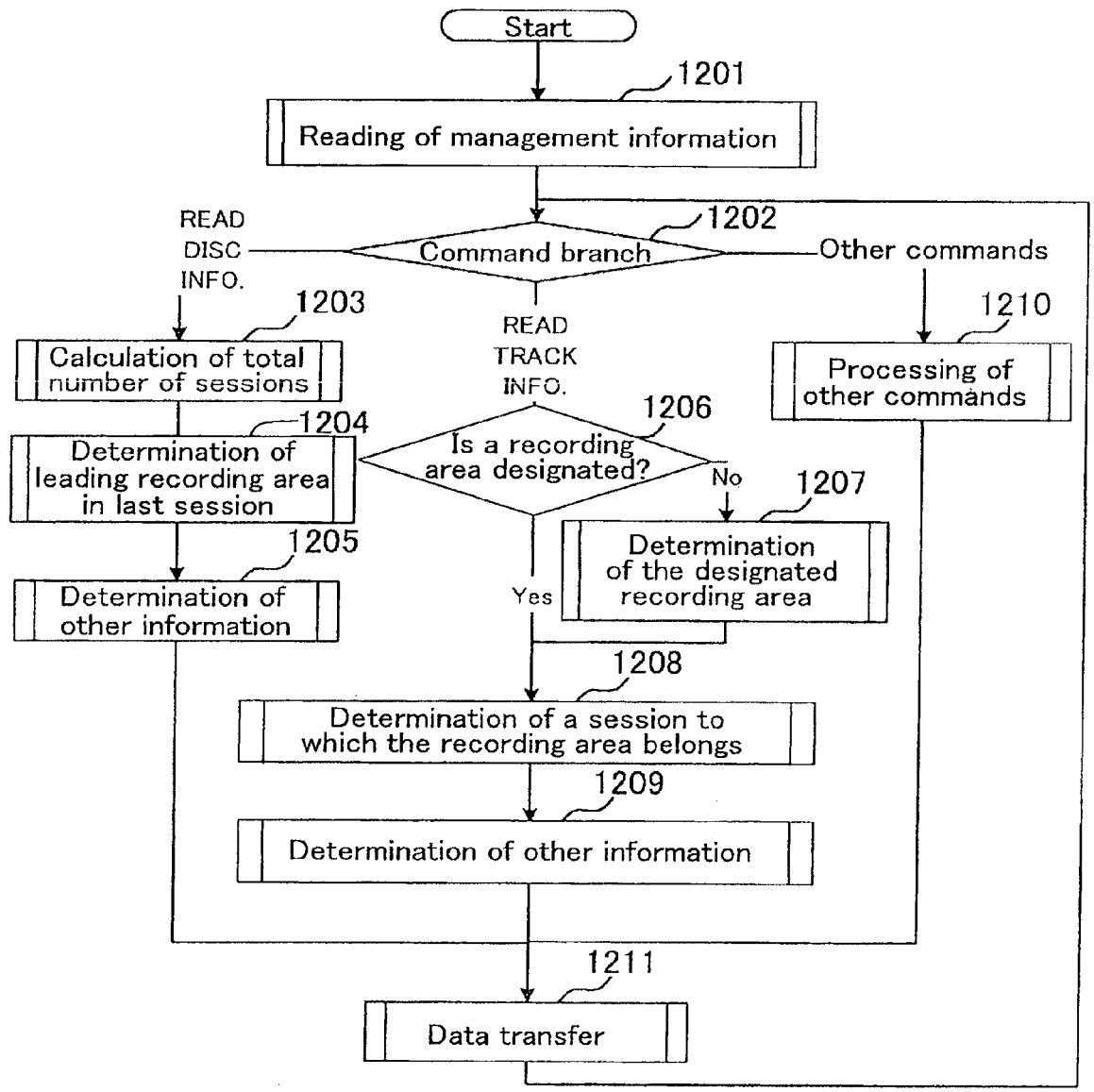
FIG. 19 is a flowchart showing a reproduction procedure according to an embodiment of the present invention.

FIG. 19 shows a reproduction procedure according to an embodiment of the present invention.

Hereinafter, a reproduction procedure according to an embodiment of the present invention will be described step by step with reference to FIGS. 18 and 19.

Step 1201: when the optical disc 1 is loaded in the optical disc apparatus, 200, the management information reading section 261 reads out the latest management information 8, and stores the latest management information 8 into the management information storing buffer 240.

Step 1202: the optical disc apparatus 200 is ready to receive commands relating to the optical disc 1 from a higher-level control apparatus until the optical disc 1 is ejected or the power source is turned off.

When a READ DISC INFORMATION command is issued to the optical disc 1, the process goes to step 1203. When a READ TRACK INFORMATION command is issued to the optical disc 1, the process goes to step 1206. When other commands are issued to the optical disc 1, the process goes to step 1210.

The READ DISC INFORMATION command is a command from a higher-level control apparatus, which requests a report of disc information. The READ TRACK INFORMATION command is a command from a higher-level control apparatus, which requests a report of track information.

Step 1203: the total number of sessions is calculated (determined) based on the management information 8 read out.

Step 1204: a recording area which is located at the beginning of the last session, is determined (calculated).

Step 1205: other information (for example, a leading recording area on the optical disc 1 (consistently the number "1"), the last recording area in the last session (i.e., the last recording area of the optical disc 1), etc.) is obtained. Thereafter, the process goes to step 1211.

Step 1206: when the READ TRACK INFORMATION command is received from a higher-level control apparatus, it is determined whether or not TRACK is designated (a recording area is designated).

If the determination is affirmative (Yes), the process goes to step 1208. If the determination is not affirmative (No), the process goes to step 1207.

Step 1207: a recording area to which the designated logic sector number belongs is determined.

Step 1208: a session to which a predetermined recording area (the designated recording area or a recording area to which the designated logic sector number belongs) is determined (calculated).

Step 1209: other information (for example, the start position of a recording area (corresponding to the start position 13), the last position of user data (corresponding to the last recorded position 14), the number of free blocks, etc.) is determined, and the process goes to step 1211. Note that the number of free blocks can be calculated by the four fundamental operations of arithmetic based on at least one of the start position 13 and the last recorded position 14.

Step 1210: when other commands are received from a higher-level control apparatus, processing is performed in accordance with the contents of the command, the process goes to step 1211.

Step 1211: data is transferred to a higher-level control apparatus.

Figure 20:
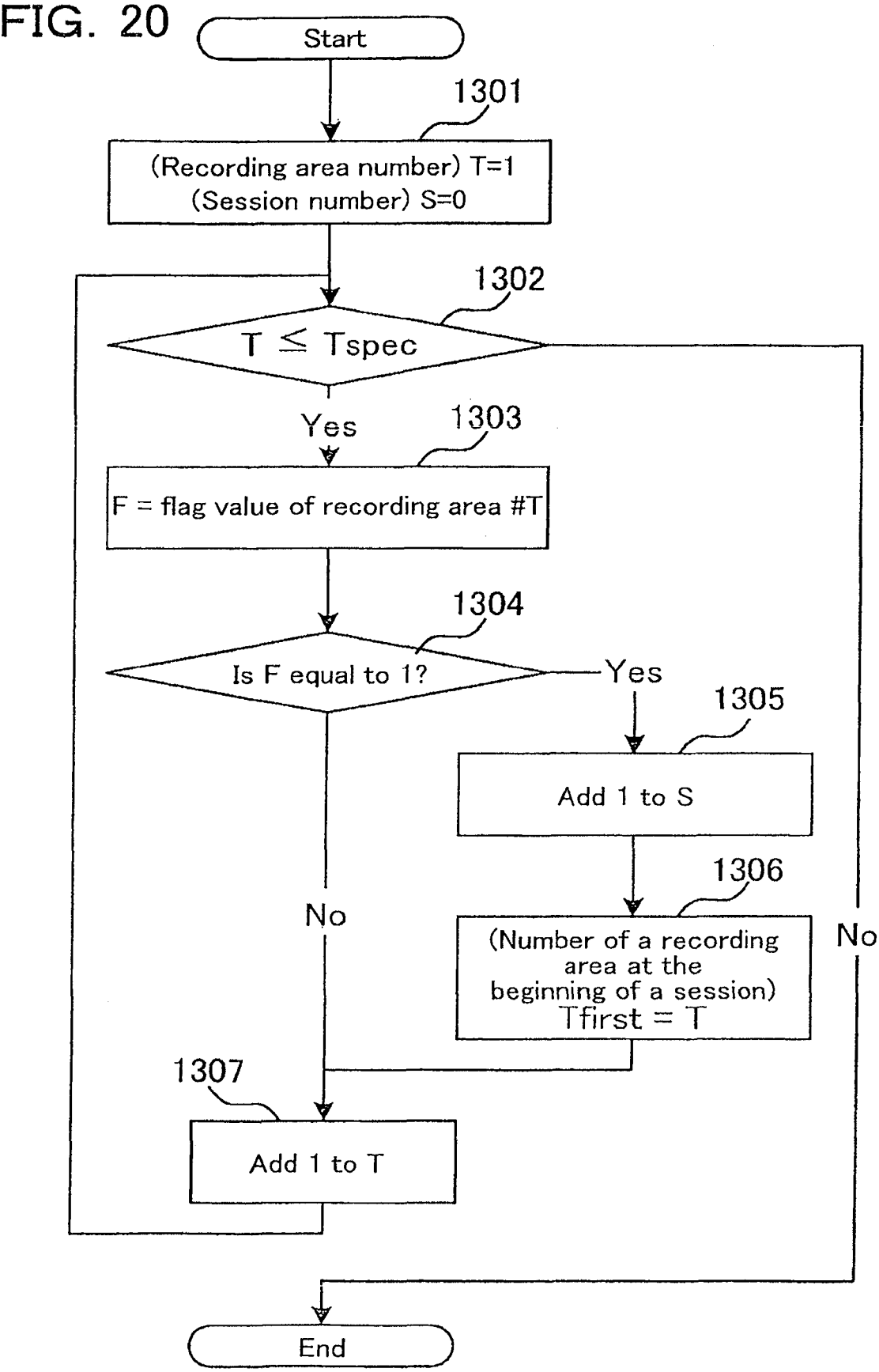
FIG. 20 is a flowchart showing an exemplary calculation procedure according to an embodiment of the present invention.

FIG. 20 shows an exemplary calculation procedure according to an embodiment of the present invention.

The calculation procedure is performed by the management information recognizing section 265 based on management information 8 containing a session start flag (FIGS. 2 to 6). The calculation procedure calculates the total number of sessions (step 1203 in FIG. 19) and determines a recording area located at the beginning of a last session (step 1204 in FIG. 19), and determines a session to which a predetermined recording area belongs (step 1208 in FIG. 19).

Note that in the calculation of the total number of sessions (step 1203 in FIG. 19) and the determination of a recording area located at the beginning of a last session (step 1204 in FIG. 19), the total number of recording areas is designated as Tspec. In the determination of a session to which a predetermined recording area belongs (step 1208 in FIG. 19), the number of a desired recording area is designated as Tspec.

Hereinafter, an exemplary calculation procedure according to an embodiment of the present invention will be described step by step with reference to FIG. 20.

Step 1301: the number T of a recording area is initialized to a number "1", and the number S of a session is initialized to a number "0".

Step 1302: it is determined whether or not the number T of a recording area is equal to or smaller than the number Tspec of the designated recording area.

If the determination is affirmative (Yes), the process goes to step 1303. If the determination is not affirmative (No), the process is ended.

Step 1303: the value of the session start flag 12 given to the recording area #T is substituted into F (F=the value of the session start flag 12 given to the recording area #T).

Step 1304: it is determined whether or not the value of F is equal to a value of "1".

If the determination is affirmative, the process goes to step 1305. If the determination is not affirmative, the process goes to step 1307.

Step 1305: "1" is added to the session number S. Thereafter, the process goes to step 1306.

Step 1306: T is substituted into Tfirst (the number of a recording area located at the beginning of a session).

Step 1307: 1 is added to the recording area number T to proceed into the next recording area.

If the total number of recording areas is substituted into Tspec, the total number of sessions is stored into S, and the number of a recording area located at a last session is stored into Tfirst.

If the number of a desired recording area is substituted into Tspec, the number of a session to which the recording area belongs is stored into S, and the number of a recording area located at the beginning of the session is stored into Tfirst.

Figure 21:
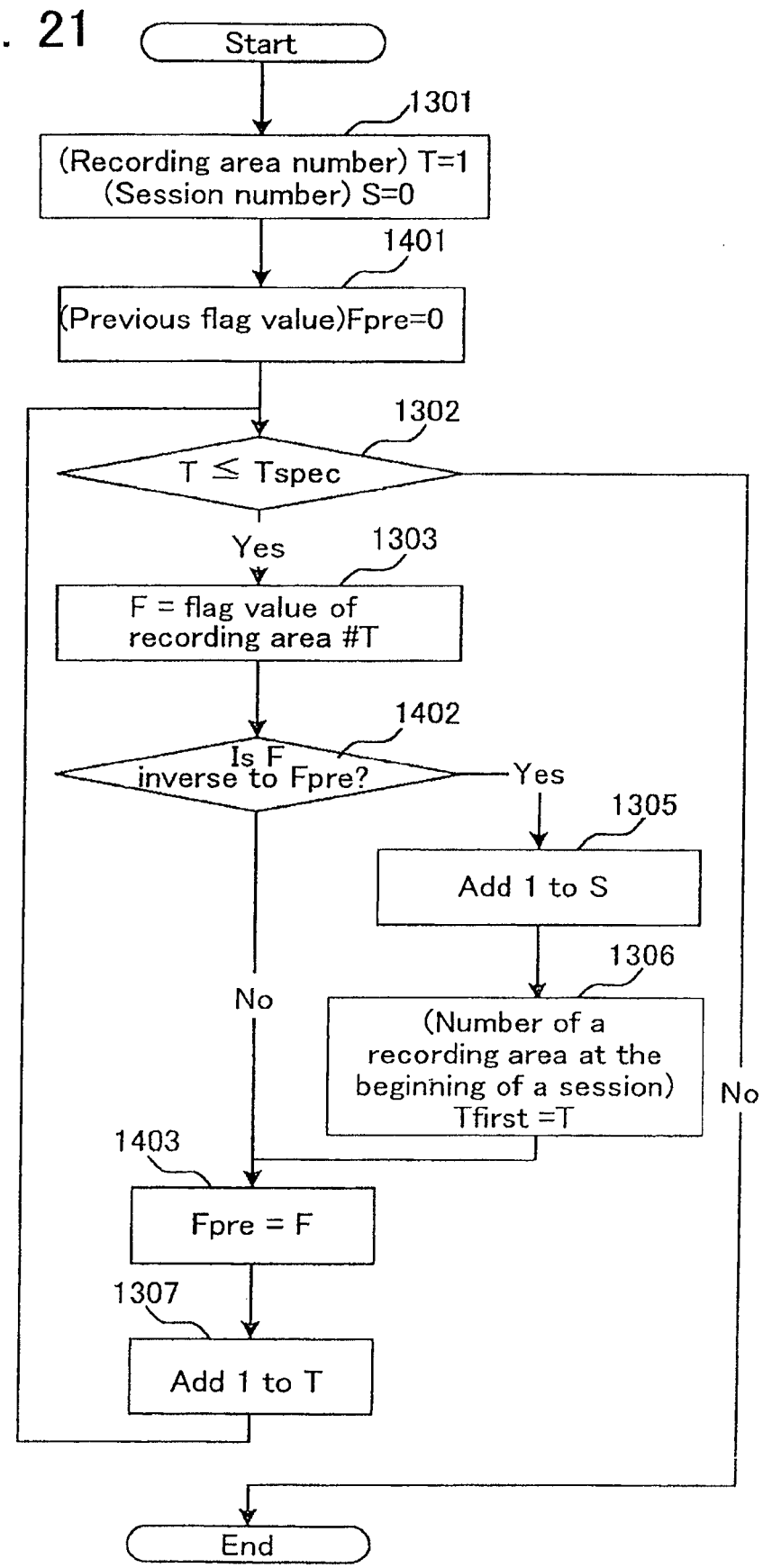
FIG. 21 is a flowchart showing another exemplary calculation procedure according to an embodiment of the present invention.

FIG. 21 shows another exemplary calculation procedure according to an embodiment of the present invention.

The calculation procedure is performed by the management information recognizing section 265 based on management information 8 containing a session toggle flag (FIGS. 7 and 8). The calculation procedure calculates the total number of sessions (Step 1203 in FIG. 19), determines a recording area located at the beginning of a last session (Step 1204 in FIG. 19), and determines a session to which a predetermined recording area belongs (Step 1208 in FIG. 19).

A method for designating Tspec, and the meanings of S after calculation and Tfirst, are similar to those which are described with reference to FIG. 20. In FIG. 21, the same step as that in FIG. 20 is referenced with the same reference numeral, and its description is omitted.

Hereinafter, another exemplary calculation procedure according to an embodiment of the present invention will be described step by step with reference to FIG. 21.

Step 1401: before performing step 1302, the previous flag value Fpre is initialized to a value of "0".

Step 1402: instead of performing step 1304 (FIG. 20), it is determined whether or not the current flag value F is inverse to the previous flag value Fpre.

If the determination is affirmative (Yes), the process goes to step 1305. If the determination is not affirmative (No), the process goes to step 1403.

Step 1403: before proceeding to the next recording area (step 1307), the previous flag value Fpre is set to be the current flag value F (Fpre=F).

Figure 22:
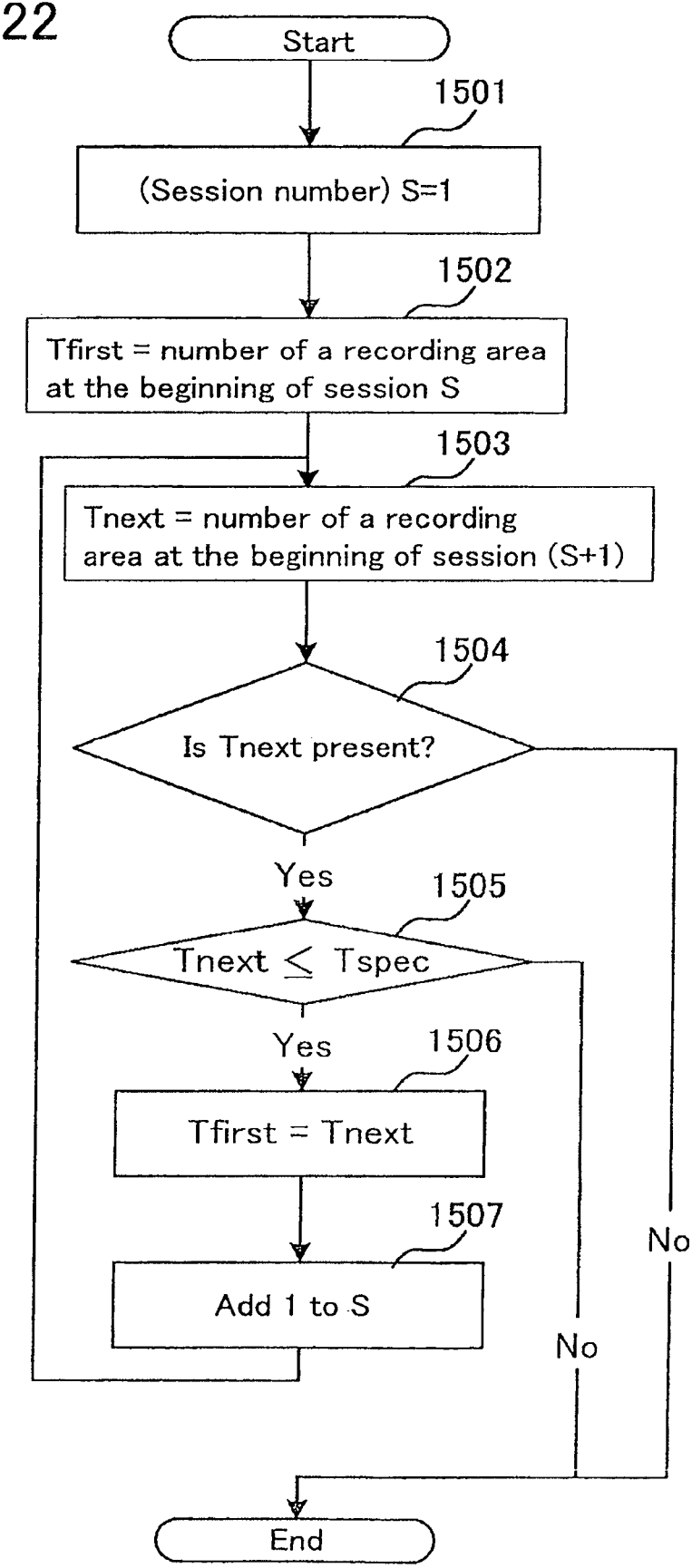
FIG. 22 is a flowchart showing still another exemplary calculation procedure according to an embodiment of the present invention.

FIG. 22 shows still another exemplary calculation procedure according to an embodiment of the present invention.

The calculation procedure is performed by the management information recognizing section 265 based on management information 8 containing an entry number array of recording areas located at sessions (FIGS. 9 and 10). The calculation procedure calculates the total number of sessions (step 1203 in FIG. 19), determines a recording area located at the beginning of a last session (Step 1204 in FIG. 19), and determines a session to which a predetermined recording area belongs (step 1208 in FIG. 19).

A method for designating Tspec, and the meanings of S after calculation and Tfirst, are similar to those which are described with reference to FIG. 20.

Hereinafter, still another exemplary calculation procedure according to an embodiment of the present invention will be described step by step with reference to FIG. 22.

Step 1501: the session number S is initialized to a number "1".

Step 1502: Tfirst is initialized to the number of a recording area located at the beginning of the session #S.

Step 1503: Tnext is set to be the number of a recording area located at the next session #(S+1).

Step 1504: it is determined whether or not Tnext exists.

If the determination is affirmative (Yes: Tnext≠0), the process goes to step 1505. If the determination is not affirmative (No: Tnext=0), the process is ended.

Step 1505: it is determined whether or not Tnext is equal to or smaller than the designated recording area number Tspec.

If the determination is affirmative (Yes), the process goes to step 1506. If the determination is not affirmative (No), the process is ended.

Step 1506: Tfirst is set to be Tnext.

Step 1507: 1 is added to the session number S to proceed the next session.

Thus, according to the reproduction method and the reproduction apparatus of the present invention, management information can be reproduced from the write-once recording medium of the present invention. The size of an area for reproducing management information is small in the write-once recording medium of the present invention. Therefore, it is possible to reduce the time required for searching for the latest management information. As a result, it is possible to reduce the time spent from when the user loads the write-once recording medium into an apparatus to when a user data area of the write-once recording medium becomes accessible.

The reproduction method of the embodiment of the present invention has been heretofore described with reference to FIGS. 19 to 22.

For example, in the embodiment of FIG. 19, step 1201 corresponds to the "step of reading out management information from a management information area", and steps 1203, 1204 and 1208 correspond to the "step of recognizing information regarding a session based on the management information read out".

However, the reproduction method of the present invention is not limited to the embodiment of FIG. 19. The reproduction method of the present invention may be achieved by any arbitrary procedure as long as the procedure has functions of the "step of reading out management information from a management information area" and the "step of recognizing information regarding a session based on the management information read out".

Embodiments of the present invention will be described with reference to FIGS. 1 to 22.

The layout of areas in the write-once recording medium of the embodiments of the present invention is provided as an example. In the embodiments, the management information area 7 is provided in the lead-in area 4. The present invention is not limited to this. The management information area 7 may be provided in an area other than the lead-in area 4. For example, the management information area 7 is provided may be provided in the lead-out area 6 or the data area 5.

In the above-described embodiments of the present invention, the order of reading information from areas is provided as an example. For example, management information 8 is incrementally written into a management information area 7 of the optical disc 1 from its inner periphery to its outer periphery. The present invention is not limited to this. Management information 8 may be incrementally written into a management information area 7 of the optical disc 1 from its outer periphery to its inner periphery.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

For a large-capacity optical disc capable of recording/reproduction using short-wavelength laser (e.g., blue laser) and an apparatus capable of recording/reproduction of the optical disc, a reduction in the size of management information is useful in terms of the available capacity of an optical disc and the memory capacity of an apparatus.

The present invention can be applied to not only a write-once recording medium but also, for example, a rewritable recording medium which is virtually used as a write-once recording medium.

What is claimed is:

1. A write-once recording medium, comprising:
   a management information area for recording management information for managing a recorded state; and
   a user data area for recording user data,
   wherein the user data area is configured to contain at least one recording area,
   at least one session is configured to contain at least one of the at least one recording area,
   the management information contains range information indicating a recording range of the at least one recording area and identification information for identifying the recording area located at a boundary of the session,
   the identification information is a flag provided to the recording area,
   the flag has either a value of "0" or a value of "1",
   the management information also contains a writable recording area number array indicating a writable recording area, and
   information indicating a non-writable recording area is removed from the writable recording area number array without recording any data into the recording area.

2. A reproducing method for reproducing information from the write-once recording medium according to claim 1.

3. A recording method for recording information from the write-once recording medium according to claim 1.

* * * * *

UNITED STATES PATENT AND TRADEMARK OFFICE
CERTIFICATE OF CORRECTION

| | | |
|---|---|---|
| PATENT NO. | : 7,859,981 B2 | Page 1 of 1 |
| APPLICATION NO. | : 12/408754 | |
| DATED | : December 28, 2010 | |
| INVENTOR(S) | : Motoshi Ito and Hiroshi Ueda | |

It is certified that error appears in the above-identified patent and that said Letters Patent is hereby corrected as shown below:

Column 26, line 20, "A recording method from recording information from"
    should read -- A recording method for recording information onto --.

Signed and Sealed this
Twelfth Day of April, 2011

David J. Kappos
*Director of the United States Patent and Trademark Office*